(12) United States Patent
Seetharam et al.

(10) Patent No.: US 11,113,365 B2
(45) Date of Patent: Sep. 7, 2021

(54) SYSTEM AND METHOD TO LIMIT CONTENT DISTRIBUTION

(71) Applicant: ARRIS Enterprises LLC, Suwanee, GA (US)

(72) Inventors: Ananth Seetharam, Bangalore (IN); Paul R. Osborne, Auckland (NZ); Sean J. Higgins, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 277 days.

(21) Appl. No.: 16/209,161

(22) Filed: Dec. 4, 2018

(65) Prior Publication Data

US 2019/0171795 A1 Jun. 6, 2019

Related U.S. Application Data

(60) Provisional application No. 62/594,403, filed on Dec. 4, 2017.

(51) Int. Cl.
| | |
|---|---|
| *H04L 29/06* | (2006.01) |
| *G06F 21/10* | (2013.01) |
| *G06F 3/06* | (2006.01) |
| *H04L 9/08* | (2006.01) |
| *H04N 21/6334* | (2011.01) |

(Continued)

(52) U.S. Cl.
CPC ............ *G06F 21/10* (2013.01); *G06F 3/0604* (2013.01); *G06F 3/067* (2013.01); *G06F 3/0647* (2013.01); *H04L 9/08* (2013.01); *H04L 63/104* (2013.01); *H04N 21/2347* (2013.01); *H04N 21/2541* (2013.01); *H04N 21/6334* (2013.01); *G06F 2221/0744* (2013.01); *H04L 2209/603* (2013.01); *H04L 2463/103* (2013.01)

(58) Field of Classification Search
CPC ...... G06F 21/10; G06F 3/0604; G06F 3/0647; G06F 3/067; G06F 2221/0744; H04L 2209/603; H04L 2463/101; H04L 9/08; H04L 63/104; H04N 21/2541
See application file for complete search history.

(56) References Cited

U.S. PATENT DOCUMENTS

| | | | |
|---|---|---|---|
| 8,838,149 B2 | 9/2014 | Hasek | |
| 9,215,236 B2 * | 12/2015 | Kennedy | ................. G06F 21/10 |

(Continued)

FOREIGN PATENT DOCUMENTS

| | | |
|---|---|---|
| CN | 104868998 B | 8/2017 |
| WO | 2006/091304 A2 | 8/2006 |

OTHER PUBLICATIONS

Amazon Web Services, "Amazon CloudFront Developer Guide API Version", Dated Sep. 29, 2016.

(Continued)

*Primary Examiner* — Thaddeus J Plecha
(74) *Attorney, Agent, or Firm* — Chernoff, Vilhauer, McClung & Stenzel, LLP

(57) ABSTRACT

A content distribution system that groups assets sharing the same required security capabilities in digital rights management service instances. Assets are encrypted with the help of media keys, effectively grouping media keys sharing the same required security capabilities. Digital rights management service instances are organized to cover different geographical areas, and asset groups are configured to migrate according to a configurable distribution range.

23 Claims, 24 Drawing Sheets

(51) Int. Cl.
*H04N 21/2347* (2011.01)
*H04N 21/254* (2011.01)

(56) References Cited

U.S. PATENT DOCUMENTS

| | | | | |
|---|---|---|---|---|
| 9,351,025 | B1* | 5/2016 | Maughan | H04N 21/23418 |
| 10,223,438 | B1* | 3/2019 | Xu | G06F 16/285 |
| 2002/0051540 | A1 | 5/2002 | Glick et al. | |
| 2008/0037442 | A1* | 2/2008 | Bill | H04L 41/12 |
| | | | | 370/254 |
| 2010/0226301 | A1* | 9/2010 | Lohmar | H04L 47/826 |
| | | | | 370/312 |
| 2011/0299427 | A1* | 12/2011 | Chu | H04L 12/1854 |
| | | | | 370/256 |
| 2012/0066493 | A1* | 3/2012 | Widergren | H04L 63/0428 |
| | | | | 713/160 |
| 2013/0132601 | A1* | 5/2013 | El-Beltagy | H04L 65/4084 |
| | | | | 709/231 |
| 2013/0191443 | A1* | 7/2013 | Gan | H04L 67/1097 |
| | | | | 709/203 |
| 2014/0189780 | A1* | 7/2014 | He | G06F 21/6218 |
| | | | | 726/1 |
| 2017/0206523 | A1* | 7/2017 | Goeringer | G06Q 20/409 |
| 2017/0295144 | A1 | 10/2017 | Song et al. | |
| 2020/0412828 | A1* | 12/2020 | Zhu | H04L 67/1008 |

OTHER PUBLICATIONS

DASH Industry Forum, "DASH-IF Implementation Guidelines: Token-based Access Control for DASH (TAC)", Draft Version 1.0 (Community Review), Jul. 20, 2016.
PCT International Search Report & Written Opinion, Re: Application No. PCT/US2018/063927, dated Mar. 28, 2019.

* cited by examiner

SYSTEM AND METHOD TO LIMIT CONTENT DISTRIBUTION

CROSS-REFERENCE TO RELATED APPLICATIONS

This application claims benefit of U.S. Provisional Patent Application No. 62/594,403, entitled "SYSTEM AND METHOD TO LIMIT CONTENT DISTRIBUTION," by Ananth Seetharam, Sean Higgins and Paul Osborne, filed Dec. 4, 2017, which application is hereby incorporated by reference herein.

This application is related to the following and commonly assigned patent application(s), all of which applications are incorporated by reference herein:

application Ser. No. 16/119,335, entitled "SYSTEM AND METHOD FOR PROTECTING CONTENT," filed on Aug. 31, 2018, by Ananth Seetharam, Sean Higgins, and Paul Osbourne; and application Ser. No. 16/119,412, entitled "SYSTEM AND METHOD TO CONFIGURE REQUIRED SECURITY CAPABILITIES," filed Aug. 31, 2018, by Ananth Seetharam, Sean Higgins, and Paul Osbourne, and Alexander Medvinsky.

BACKGROUND

1. Field

The present disclosure relates to systems and methods for disseminating media program content, and in particular to a system and method for limit such dissemination.

2. Description of the Related Art

In the distribution of media programs for viewing, legal and business requirements may demand that certain content be restricted to specific geographies. For example, it may be desirable to provide a new release of a 4K resolution movie to devices in only region A on Jan. 1, 2017, and in both region A and region B on Feb. 2, 2017. Additionally, content providers (e.g. HBO) may require that an asset only be provided to devices that satisfy a minimum required security capability (RSC).

Broadly speaking, this can be accomplished by restricting the flow of content through content distribution networks (CDNs) to certain geographies, or by permitting unrestricted content flow through CDNs and having the CDNs authorize content based on the location of the device requesting the asset. However, since CDNs may be provided by third parties (for example, a tier 3 service provider using a third party CDN such as AKAMAI), the management of the CDNs may require crossing of organizational boundaries, and integrating the CDN into access decisions. Unfortunately, the focus of such CDNs is to optimize delivery of the asset, not restricting access to the asset.

FIG. 1 is a diagram of a content distribution system (CDS) 100 illustrating asset distribution paradigms. The CDS 100 comprises an encryptor 102 that encrypts the asset, communicatively coupled to an origin server 104. In a push CDS 100 model with no URL redirection, assets are pushed to the CDN nodes from the origin server and network layout allows devices to connect to only CDN nodes 106 in their geographical region (as shown by solid lines). For example, device A 108A can only connect to CDN-A 106A and device B 108B can only connect to CDN-B 106B. This model increases the complexity of CDN 106 management if content must be restricted only to certain nodes, as some mechanism must enforce distribution of assets only to the appropriate CDN 106, which typically crosses organizational boundaries between the CDN 106 and the origin server 104. In a push CDN model with URL redirection, content is pushed to the CDN nodes 106 from the origin server 104, and the origin server 104 redirects the devices 108 to the appropriate CDN node 106 to retrieve the asset. Again, this complicates CDN 106 management if the assets are restricted to only particular CDN nodes 106. In a pull CDN model, the assets are pulled by the CDN nodes 106 from the origin server, and the network layout allows devices to connect only to CDN nodes 106 in their region. Again, this complicates CDN management when the content is restricted only to particular CDN nodes.

Restricting the distribution of assets through CDNs can be effected in a number of ways. One technique is for the device in the region to send a request for the asset that specifies the location of the device to the origin server. The origin server receives this request, and checks to see if the device location permits distribution of the asset. If distribution is permitted to the location of the requesting device, the origin server responds with the asset or a message that the location is not authorized. In an alternate system, the device sends the request to the CDN node 106 in the device's region, and the CDN node 106 responds as did the origin server 104, by checking to see if the device location is permitted and responding with the asset or a message depending on the outcome of that check. In either case, the origin server 104 or CDN 106 is burdened with performing an authorization check, and in doing so, the origin server or CDN 106 must trust that the device is at the location reported in it's request message. This option also burdens the origin server 104 or the CDN 106 with performing authorization based on location, and the origin server 104 or CDN 106 may not be amendable to design changes to perform this authorization, or may not be owned by the service provider.

FIG. 2 is a diagram of another CDS 200 paradigm for distributing assets. In this paradigm, restricting the downloading of content is restricted through the CDN nodes 206, but authorization is performed by an operations support system/business support system (OSS/BSS) 210 of the service provider. As illustrated, the device 208 requests the asset from the origin server 204, and the origin server 204 refers to the request to the OSS/BSS 210 for check whether the device 208 in region A is authorized to receive the asset. The OSS/BSS 210 determines, based on the location of the device 208 obtained from infrastructure 220 of the service provider, if the device is authorized to receive the asset, and sends a message to the origin server 204 indicating as such. The origin server 204 or CDN 206 then responds to the device 208 with either the asset or an indication that the device 208 in region A is not authorized to receive the asset. This CDS paradigm 200 burdens the OSS/BSS 210, because the OSS/BSS 210 must factor the device 208 location along with the rights of the subscriber in possession of device 208. Further, the origin server 204 must integrate with the OSS/BSS 210, and the OSS/BSS 210 must interface with the service provider infrastructure 220 to track the device 208 location.

FIG. 3 is a diagram of still another CDS 300 paradigm for distributing assets. In this paradigm, the download of content through the CDN nodes 306A and 306B is restricted using URL redirection and a signed token. The process begins when the device 308A in region A or the device 308B in region B requests an asset from the origin server 304. The origin server 304 interfaces with the OSS/BSS 310 to determine whether asset is authorized to be delivered to devices in the region in which the device 308A/308B is located, with the help of service provider infrastructure 320 that is used to determine or track the device 308A/308B location. The origin server 304 obtains or generates an authorization token and if the device 308A/308B is authorized to receive the asset, provides the authorization token to the device 308A/308B along with a URL redirecting the device to the appropriate one of CDN node 306A servicing region A or CDN node 306B servicing region B. The device 308A/308B then requests the asset from the CDN node 306A/306B, and provides the authorization token. Since the CDN node 306A/306B has a trust relationship with the origin server 304, it is able to validate the authorization token received from the device 308A/308B, and if such validation is successful, responds by providing the asset to the device 308A/308B. However, this paradigm also includes unnecessary complexities. The CDN nodes 308/308B, for example, must be configured to validate tokens presented by the device 308A/308B, and must have a trust relationship with the origin server 304. The origin server 304 or CDN 306A/306B is burdened with requiring to be integrated with the OSS/BSS 310 to perform the authorization check, and the OSS/BSS 310 is burdened with determining the location of the requesting device 308A/308B for every new asset requested, and with factoring device 308A/308B location into the subscriber's rights to the asset.

There is therefore a need to limit the distribution of assets to devices with required security capabilities and to particular geographies in a simple and secure management, without complicating content management and CDN management, without burdening origin servers or CDNs to perform authorization checks, without adding integration complexity, and without burdening subscriber asset rights with device location concerns.

SUMMARY

To address the requirements described above, this document discloses a system and method for selectively providing media program assets to a plurality of devices, each device disposed in only one of a plurality of service regions and having access to only one of a plurality of digital rights management (DRM) service instances. In one embodiment the method comprises grouping the media program assets having same required security capabilities (RSC) into a plurality of asset groups, wherein each of the plurality of media programs is uniquely associated with a media key that is required to decrypt the media program asset associated with the media key, assigning one of a plurality of distribution range values to each of the plurality of asset groups. processing the media program assets so that each media program asset of the group is decryptable only by use of the media key associated with that media program asset, and hierarchically migrating only authorized asset groups from an originating DRM service instance across the other of the plurality of DRM service instances according to the assigned distribution range value of the asset group from the originating DRM service instance, wherein each of the plurality of DRM service instances serves devices disposed in only one of the service regions and is associated with only one of the plurality of distribution range values for each asset group. Another embodiment is evidenced by an apparatus or system having one or more processors and a communicatively coupled to one or more associated memories storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

The CDS 400 presented below groups assets sharing the same RSC in DRM service instances 420. Assets are encrypted with the help of media keys, effectively grouping media keys sharing the same RSC. DRM service instances 420 are organized to cover different geographical areas, and asset groups are configured to migrate according to a configurable distribution range.

This resolves the foregoing issues because DRM service instances 420 are typically owned by the service provider and naturally integrate with the OSS/BSS 410 of the service provider for authentication. Further, authorizing subscriber rights does not require the device 408 location, no integration with a device 408 location infrastructure is required. Finally, the origin server and CDN 406 are not burdened with authorization and can focus on content delivery.

Figure 1:
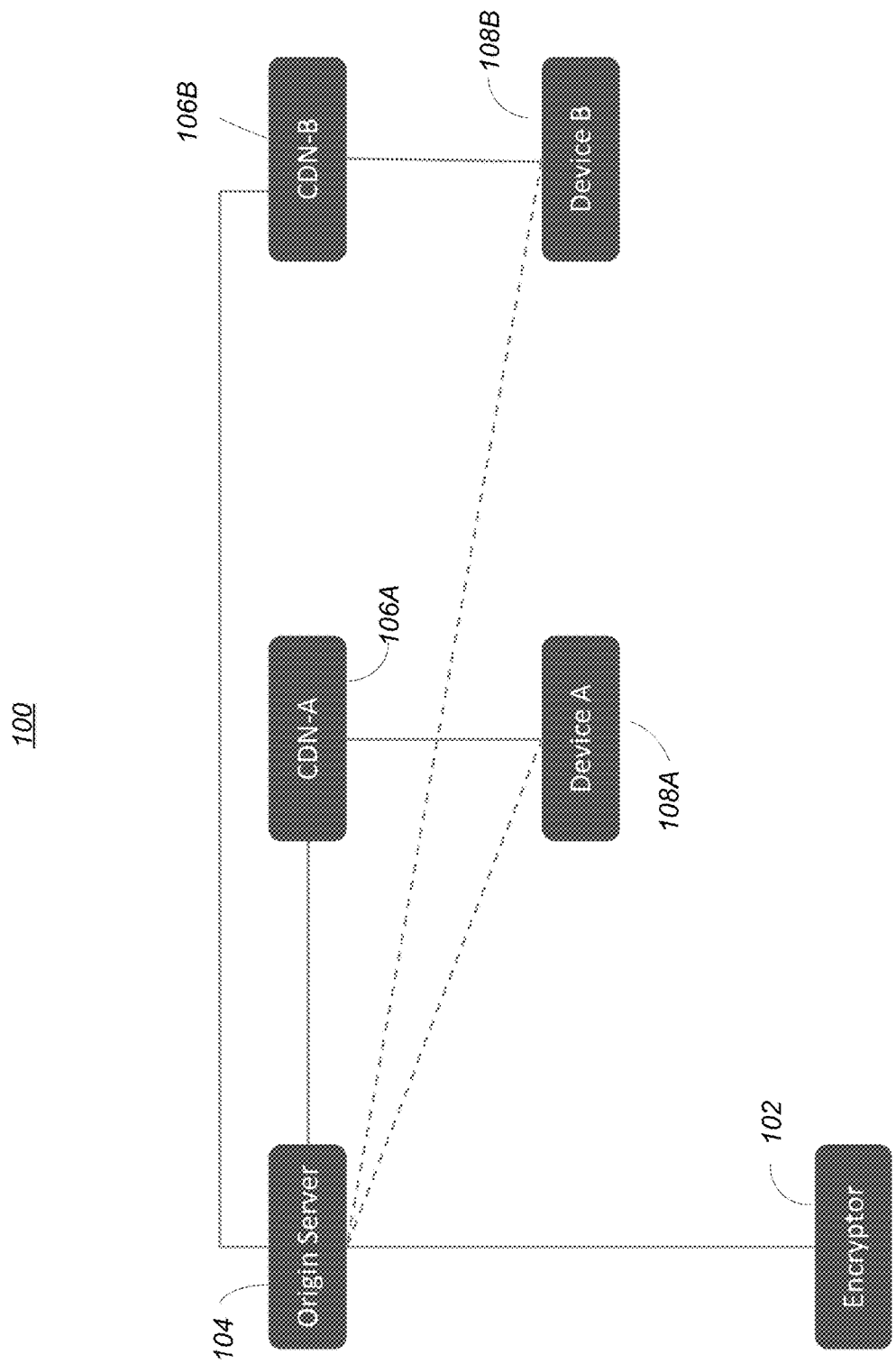
FIG. 1 is a diagram of a content distribution system.
Figure 2:
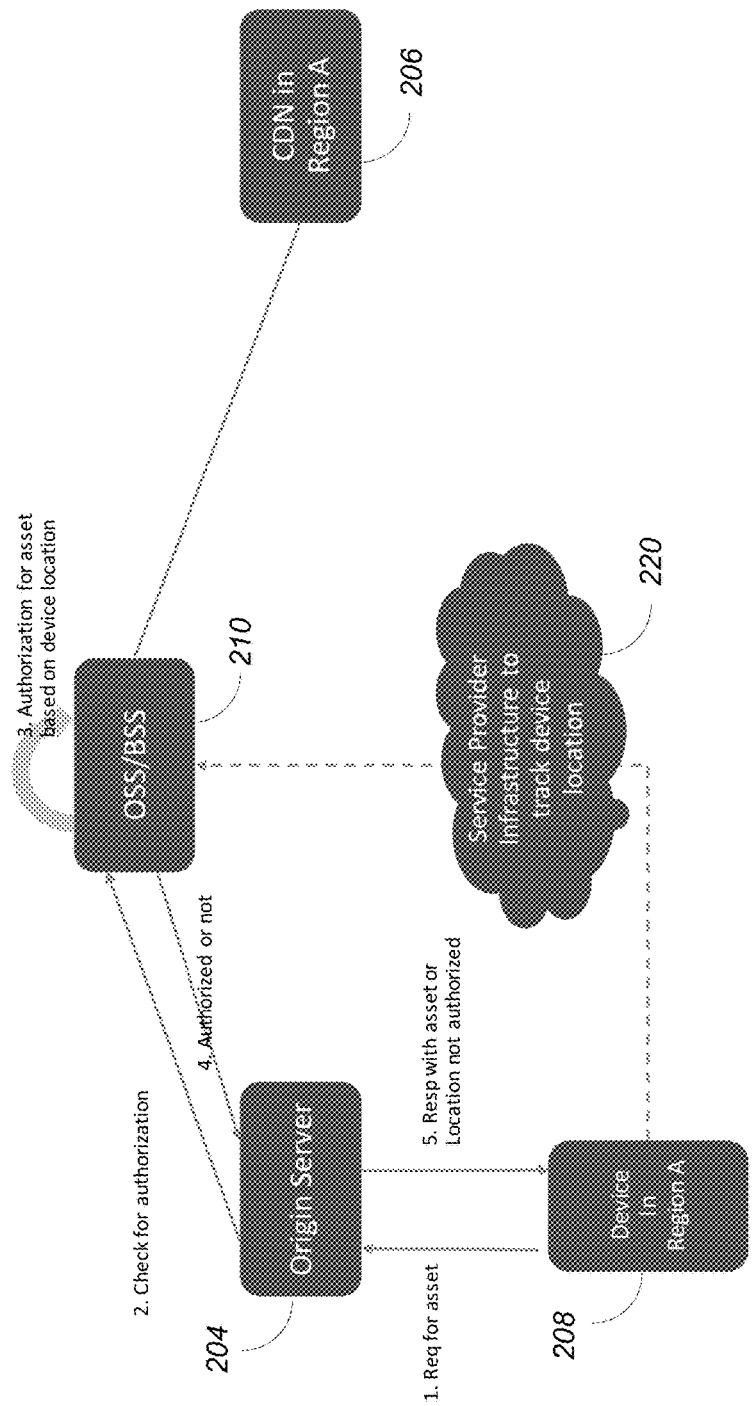
FIG. 2 is a diagram of another content distribution system paradigm for distributing assets.
Figure 3:
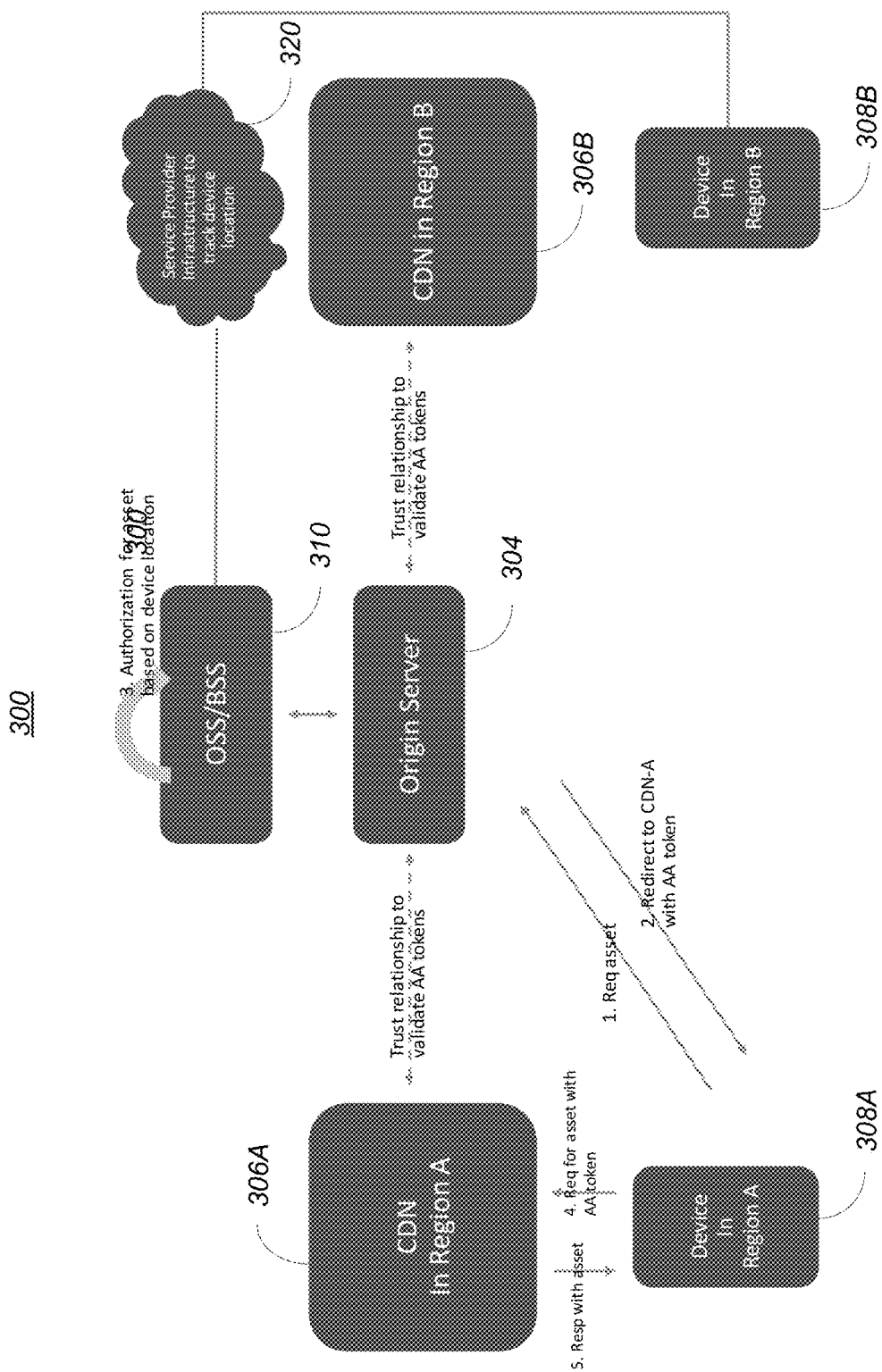
FIG. 3 is a diagram of still another content distribution system paradigm for distributing assets.
Figure 4:
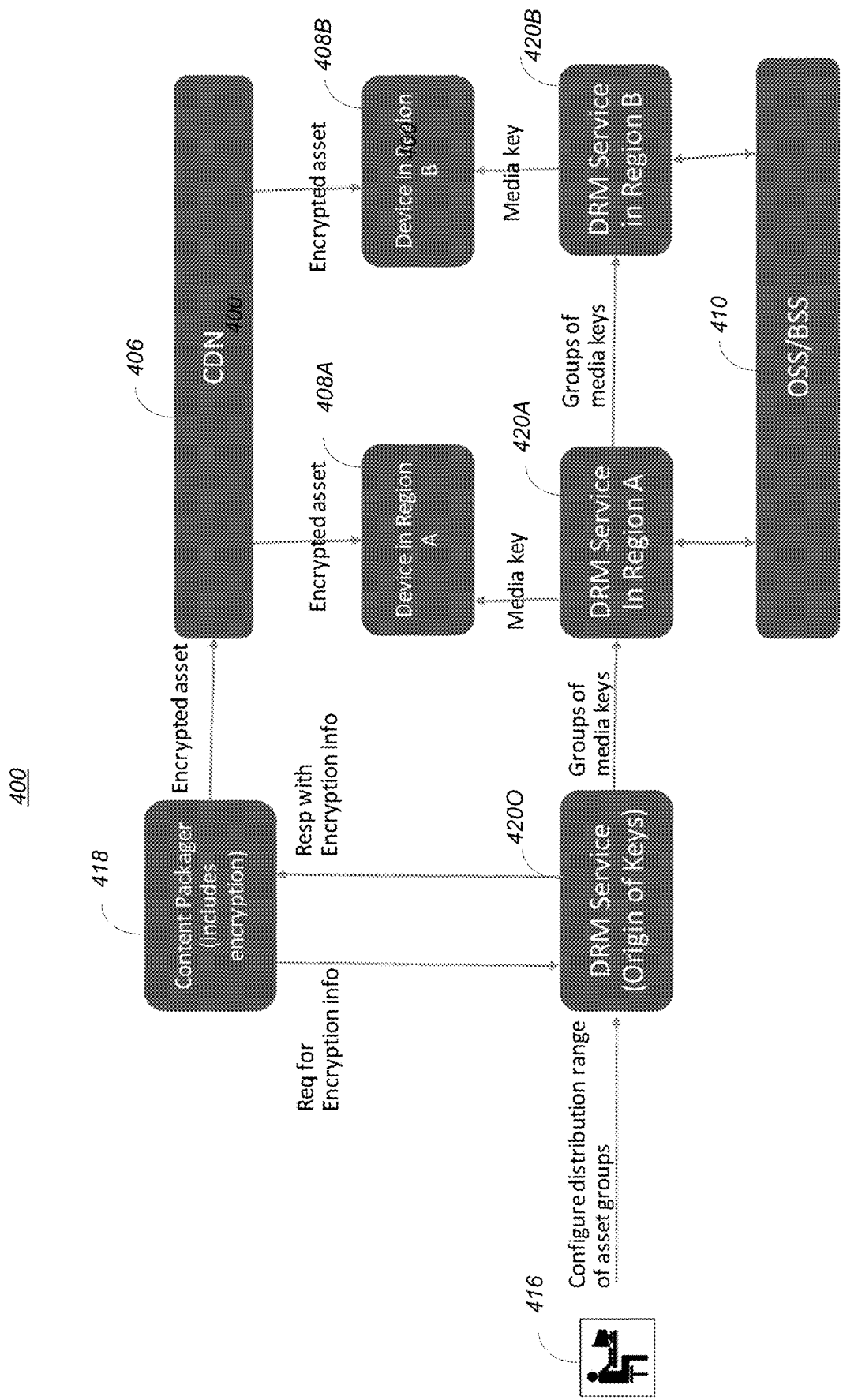
FIG. 4 is a diagram of one embodiment of an improved content distribution system.

FIG. 4 is a diagram of one embodiment of an improved CDS 400. The improved CDS includes a CDN 406 for distribution of assets in a plurality of regions, with each region served by a DRM service instance 420 in that region. The network layout allows devices 408A and 408B to connect to only those DRM service instances 420 in their region. The DRM service instances 420 interface with the OSS/BSS 410 of the service provider and with each other to migrate asset groups according to distribution ranges and permissions configured by administrators 416, as further described below.

In the illustrated embodiment, the administrator 416 groups media program assets having the same RSC into a plurality of asset groups, and provides this information to a DRM service instance 420O used to originate media keys. Each media program asset is uniquely associated with a media key that is required to decrypt the media program asset associated with the media key. The content packager 418 requests the media key associated with each asset, and uses the media key to encrypt the asset or otherwise configure the asset in such a way that the media key is required to obtain an unencrypted version of the asset.

The administrator 416 then assigns one of a plurality of distribution range values to each of the plurality of asset groups. These asset groups are then hierarchically migrated from an originating DRM service instance 420O across the other of the plurality of DRM service instances 420A, 420B according to the assigned distribution range of each asset group from the originating DRM service instance 420O. Such migration is also conditioned on further authorization provided to each DRM service instance as further described below.

In this paradigm, no attempt needs to be made to control migration across CDNs 406 or to configure CDNs 406 to verify device requests for media assets. This is made possible because the migration of the media keys necessary to access the assets is only migrated to DRM service instances 420 according to the configured distribution range of the asset group, as defined by the administrator 416, and subject to authorization of DRM service instance 420 by DRM service instance 420 basis.

Figure 5:
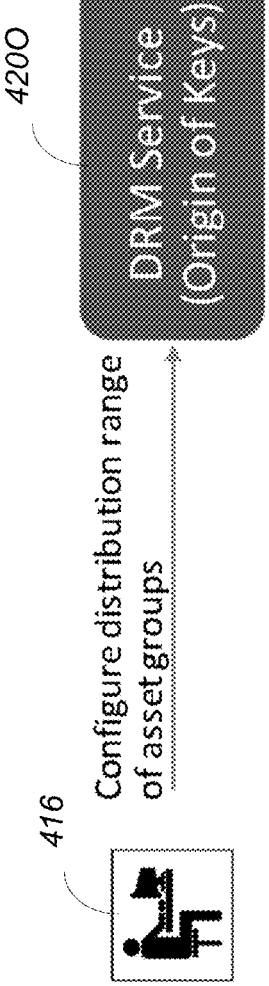
FIG. 5 is a diagram illustrating the configuration of the asset group distribution ranges.

FIG. 5 is a diagram illustrating the configuration of the asset group distribution ranges. In this example, two asset groups have been defined, each asset within the asset group having the same RSC. Asset group 1 (GP1) has a RSC suitable for presentation of a high value (HV) asset, while asset group 2 (GP2) has an RSC suitable for presentation of a very high value (VHV) asset, as indicated by the RSC table. For example, the assets in group 1 may comprise lower resolution media program assets, while group 2 may comprise higher resolution media program assets that are require a higher (e.g. more secure) RSC for presentation. In the illustrated embodiment, the administrator has also configured group GP1 (corresponding to the HV RSC) to a distribution range value of two and group GP2 (corresponding to the VHV RSC) to a distribution range of one, as indicated by the distribution range table.

Figure 6:
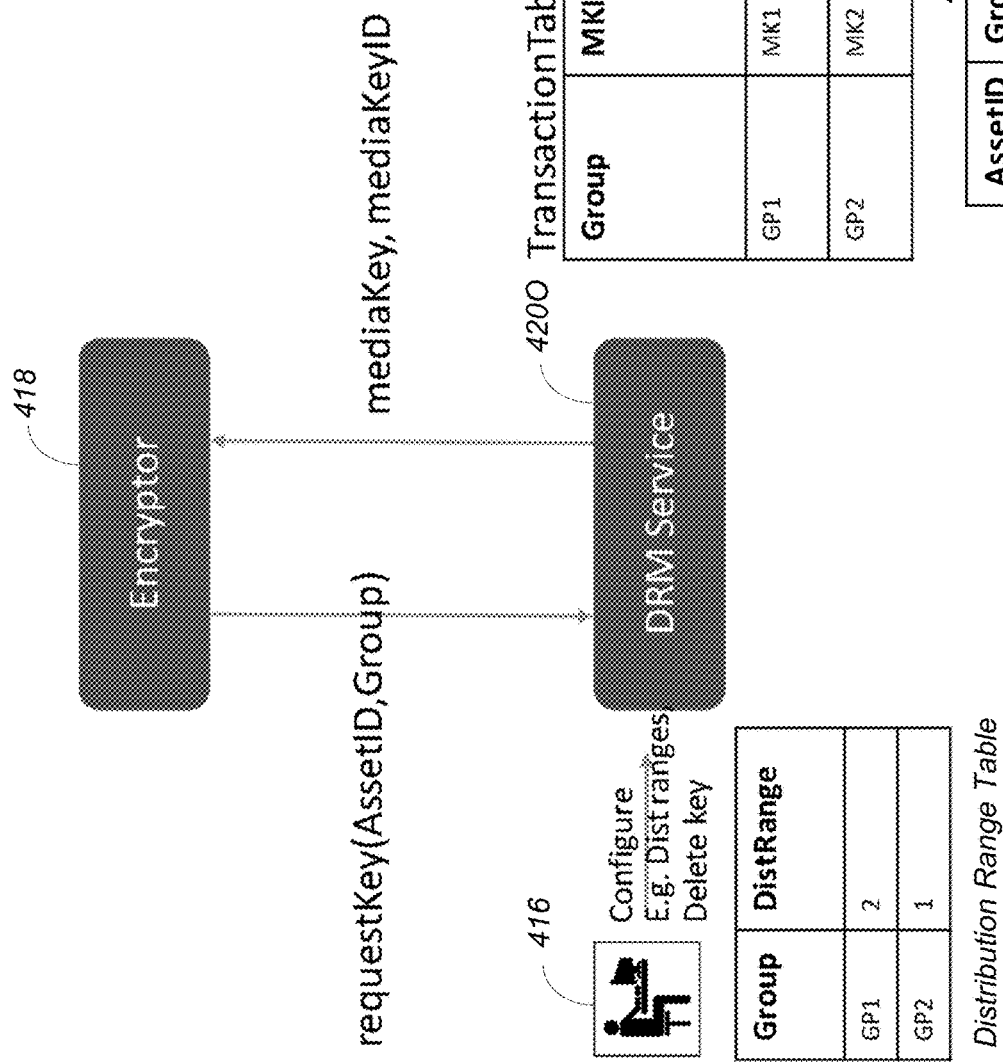
FIG. 6 is a diagram illustrating how changes in an asset group's characteristics can be configured by the administrator.

FIG. 6 is a diagram illustrating how changes in asset group characteristics can be configured by the administrator. In this example, the administrator has configured the two asset groups as described above (asset group 1 or GP1 with a distribution range of two, and group two or GP2 with a distribution range of one), as indicated by the distribution range table. The distribution range values associated with the asset groups at each DRM service instance 420 indicates how many levels of hierarchically downstream DRM service instances 420 each particular asset group is permitted to migrate. For example, a distribution range value of 1 indicates that the associated asset group is permitted to migrate to a DRM service instance 420 one level downstream from the DRM service instance 420 hosting the table, while a distribution range value of 2 indicates that the associated asset group is permitted to migrate to a DRM service instance 420 two hierarchical levels downstream from the DRM service instance 420 hosting the table.

An asset table is maintained at the DRM service instance 420, which relates an identifier of the asset (AssetID), the asset group to which it belongs (Group), the media key of the asset (MK), and an identifier of the media key (MKID). Two media keys are depicted in FIG. 6, media key MK1 having a media key ID of MKID1, which is required to decrypt or otherwise present asset AID1, which belongs to group GP1 (which is a high value asset and requires a device having an SSC of HV), and media key MK2, having a media key ID of MKID2, which is required to decrypt or otherwise present asset AID2, which belongs to group GP2 (which is a very high value asset and requires a device having a supported security capability (SSC) of VHV). The encryptor 418 requests media keys from the originating DRM service 420O by transmitting a request key message having the Asset ID and the group, and the originating DRM service 420O instance responds with the requested media key MK and media key identifier MKID. The encryptor 418 then encrypts or otherwise processes the asset before providing the asset to the CDN 406 for distribution.

The creation and deletion of media keys is recorded in a transaction table at the DRM service instance 420. The transaction table relates and associates the asset group (Group) to which the transaction applies, the media key identifier MKID, the transaction type, and a transaction identifier unique to each transaction. In one embodiment, a new and incremented transaction identifier is assigned to each subsequent transaction within the CDS 400, such that a transaction ID of one transaction is one greater than the transaction ID of the immediately preceding transaction in the CDS 400. For example, if the administrator 416 created keys MK0 previous to the creation of key MK1, the illustrated transaction table may indicate that GP1 has a media key MK0 that was added (TxnTYPE=ADD) with a transaction ID of 19, for example. Subsequent adding of media key MK1 associated with group GP1 may be indicated by transaction type ADD and transaction ID 20.

If the administrator 416 were to delete MK2 from asset group GP2, the transaction table would be modified to include a new entry related to MK2, namely that MK2, which was associated with group GP2 was deleted (TxnTYPE=DEL) and that a transaction identifier (TxnID) of 30 has been added to the transaction table. The use of serially increasing transaction identifiers provides for migration of asset groups and other information by allowing the subsequent DRM service instances to "pull" the most recent information from upstream DRM service instances 420. The deletion of MK2 is reflected in the asset table, in which media key MK2 has been deleted, along with the asset ID, asset group and media key identifier associated with the media key MK2. The foregoing techniques can be used to delete asset groups as well as media keys.

Figure 7:
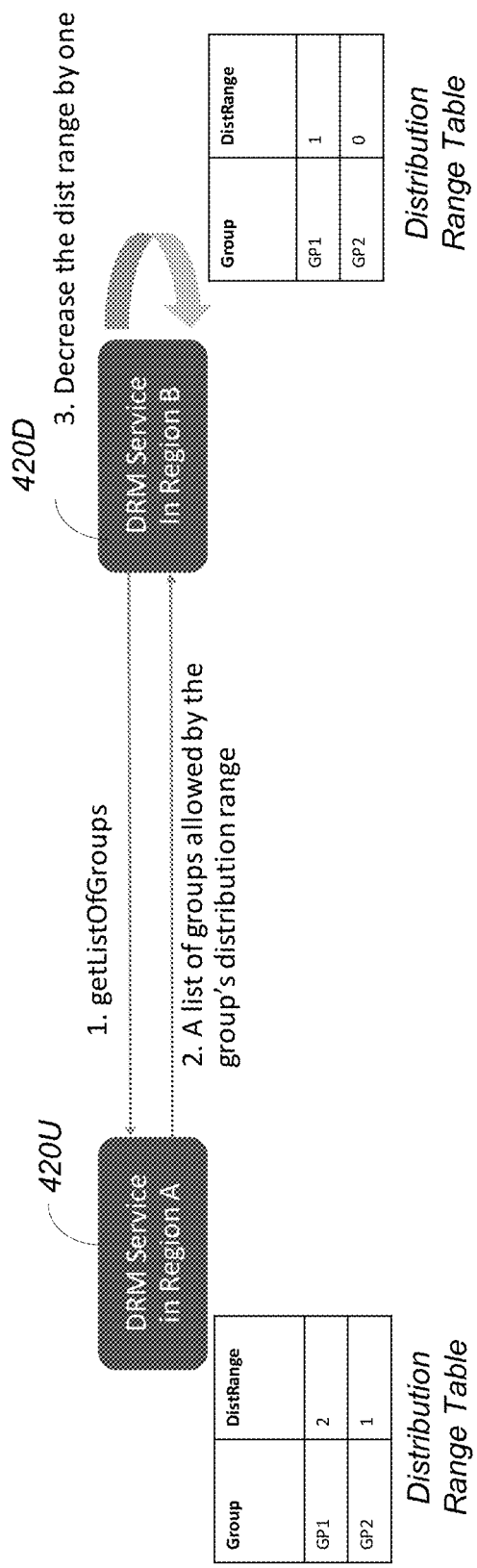
FIG. 7 is a diagram illustrating the migration of asset groups among the plurality of DRM service instances in the different regions.

FIG. 7 is a diagram illustrating the migration of asset groups among the plurality of DRM service instances in the different regions. In this embodiment, the downstream DRM service instances 420D "pull" a list of asset groups allowed by the upstream and hierarchically superior upstream DRM service instance 420U. This is accomplished by transmitting a request from the downstream DRM service 420D instance to the upstream DRM service instance 420U to get a list of asset groups allowed by the upstream DRM service instance 420U, as indicated by the distribution range table describing the distribution range value of each asset group hosted at the upstream DRM service instance 420U. The upstream DRM service instance 420U transmits a list of asset groups allowed by the upstream DRM service 420U (indicated by a distribution range value of zero or more). The downstream (requesting) DRM service 420D instance decrements the distribution range values for each of the asset groups by one and stores the decremented distribution ranges for each of the asset groups in its own distribution range table. The decremented distribution range values in the distribution range table indicate whether the asset group has migrated to the downstream DRM service instance 420D. In the illustrated example, in upstream DRM service instance 420U serving region A, asset group GP1 (corresponding to an HV RSC) has a distribution range value of two, while asset group GP2 (corresponding to an VHV RSC) has a distribution range value of one. The distribution range value of 1 indicates that the asset group GP2 will be migrated to downstream DRM service instances only one level below the upstream DRM service instance 420U. This is so because when the downstream DRM service instance 420D obtains this list and decrements the distribution range values of the asset groups on the list by one, GP2 will have a distribution range value of zero, indicating that no further migration downstream to DRM service instances (lower than 420D) at lower hierarchical levels is permitted. After the foregoing example asset groups GP1 and GP2 have migrated from upstream DRM service instance 420U in region A to downstream DRM service instance 420D in region B.

Figure 8:
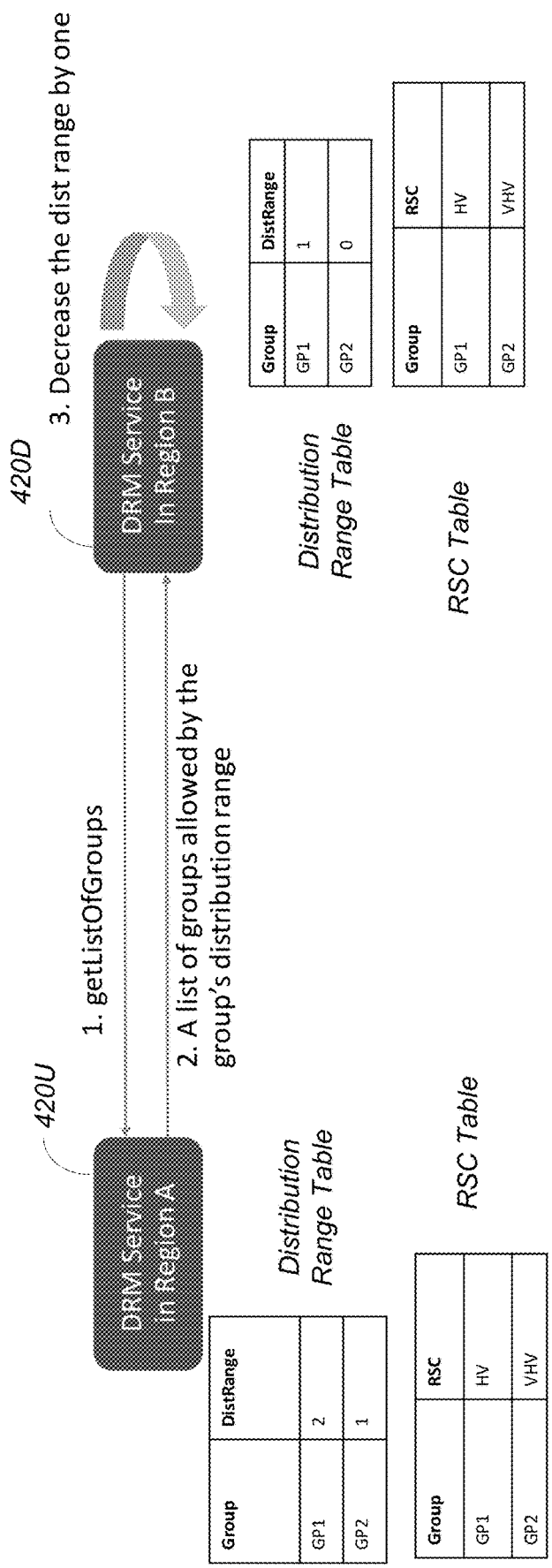
FIG. 8 is a diagram illustrating a further embodiment of the downstream migration of asset groups.

FIG. 8 is a diagram illustrating a further embodiment of the downstream migration of asset groups. In this embodiment, when the downstream DRM service instance 420D requests a list of asset groups from the upstream DRM service instance 420U, it receives not only a list of asset groups allowed by the upstream DRM service instance 420U, but also group metadata, including the RSC table entries. Hence, if the RSC associated an asset group has changed in the upstream DRM service 420U, that change will be transmitted to the downstream DRM service instance 420D and the RSC table hosted at that DRM service instance 420D will be updated as well.

Figure 9:
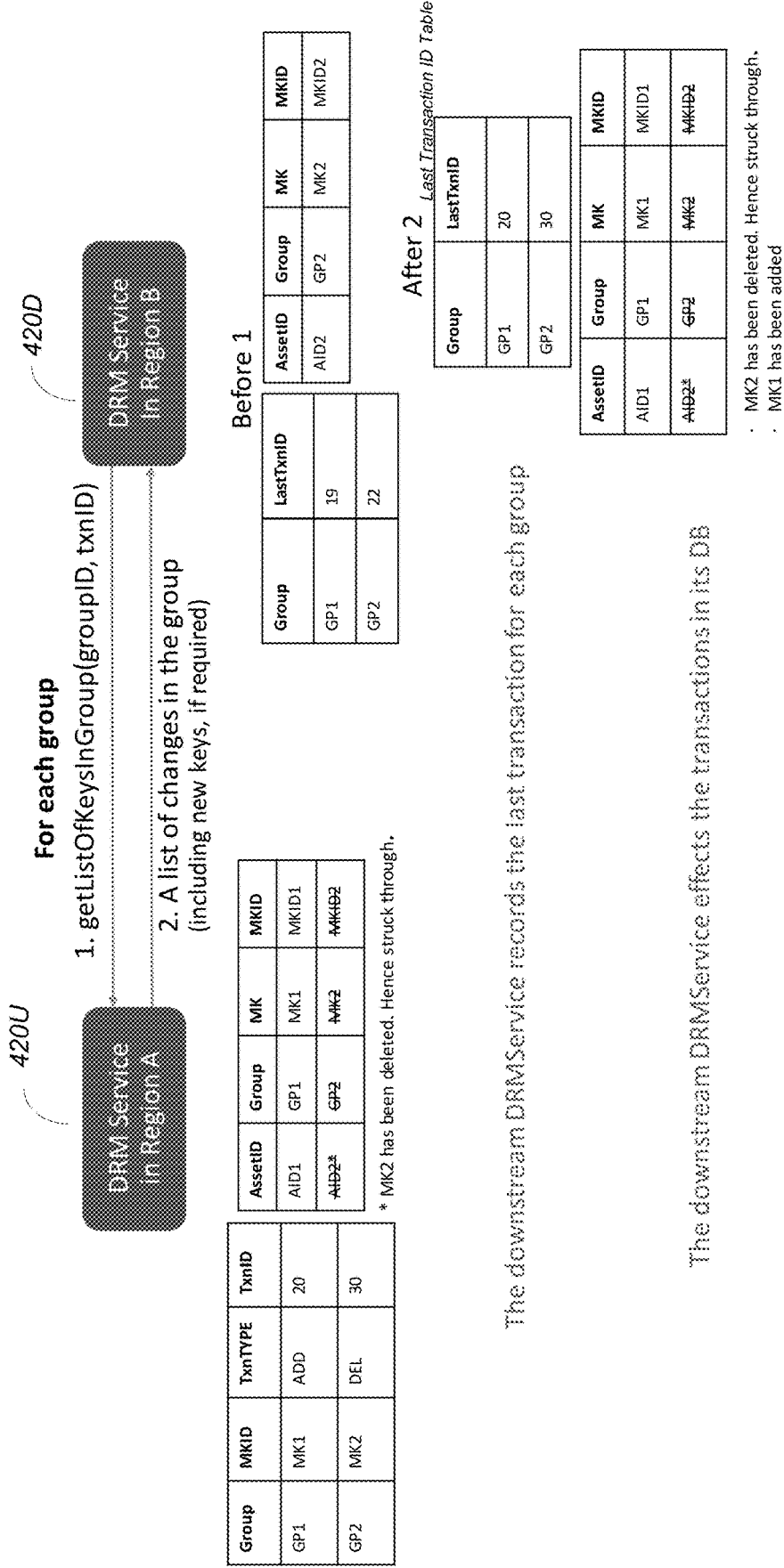
FIG. 9 is a diagram illustrating the use of the transaction identifiers in the migration of asset groups.

FIG. 9 is a diagram illustrating the use of the transaction identifiers in the migration of asset groups. In this example, the upstream DRM service instance 420U has defined asset groups GP1 and GP2 as described above. The administrator 416 added media key MK1 for asset group GP1, as indicated by the ADD transaction type and the transaction identifier of 20. The administrator 416 also added media key MK2 for asset group GP2 with a transaction ID of 22, and later deleted media key MK2 for asset group GP2, with a transaction ID of 30. The administrator's deletion of asset key MK2 is reflected in the asset table and the most recent transaction relating to each key or group in the transaction table is reflected by the ADD transaction type for media key MK1 of asset group GP1 having a transaction ID of 20 and the DEL (delete) transaction type for media key MK2 of asset group GP2.

Before the downstream DRM service instance 420D attempts to pull authorized asset groups from the upstream DRM service instance 420U, its asset table indicates that the last transaction with respect to group GP1 had a transaction ID of 19, and the last transaction with respect to group GP2 had a transaction ID of 22. Also before the downstream DRM service 420D attempts to pull authorized asset groups from the upstream DRM service instance 420U, its asset group table indicates an asset AID1 belonging to the asset group GP1 and associated with media key MK1 having a media key ID of MKID1 and an asset AID2 belonging to asset group GP2 and associated with media key MK2 having a media key ID of MKID2 have already been migrated to the downstream DRM service instance 420D. The downstream DRM service instance 420D requests a list of keys in a particular asset group. This request includes the group ID of the asset group and the transaction ID associated with that group in the downstream DRM service instance 420D. In response the upstream DRM service instance 420U provides a list of changes to the asset group, including related metadata such as deleted keys or new keys or RSC. The list of changes is generated by comparing the transaction ID the downstream DRM service 420D has associated with the asset group with the transaction ID the upstream DRM service 420U has associated with the asset group.

In the illustrated example, the downstream DRM service instance 420D records a last transaction ID of 19 for asset group GP1, while the upstream DRM service instance 420U records a last transaction ID of 20 for asset group GP1. In requesting the list of keys in asset group GP1, the downstream DRM service instance includes the transaction ID of 19. Since the upstream DRM service instance 420U has higher transaction ID (a transaction ID of 20, indicating this transaction occurred after the transaction by which group asset GP1 was migrated to the downstream DRM service instance 420D), this indicates that the list of changes includes a change to asset group GP1. In particular, that media key MK1 of group GP1 is on the list of changes in asset group GP1.

Also in the illustrated example, the downstream DRM service instance 420D records a last transaction ID of 22 for the asset group GP2. In a second request for the list of keys in asset group GP2, the downstream DRM service instance includes the associated transaction ID of 22. Since the upstream DRM service instance 420U has a higher transaction ID for group GP2 (a transaction ID of 30, indicating this transaction occurred after the transaction involving group GP1), changes to group GP2 (including new keys and RSCs) are included in the response transmitted to the downstream DRM service instance 420D.

FIG. 9 also illustrates the status of a last transaction ID table after a list of changes to both GP1 and GP2 have been requested and received by the downstream DRM service 420D. As illustrated, the last transaction ID table includes a last transaction ID for asset group GP1 of 20 (as that was the transaction ID associated with the adding of MK1 to group GP1 in the originating DRM service instance, which in this case, is the upstream DRM service instance 420U), and a transaction ID for asset group GP2 of 30 (as that was the transaction ID of deleting media key MK2 from group GP2 in the originating DRM service instance).

Finally, FIG. 9 also illustrates the status of the group asset table, indicating that media key MK2 associated with asset AID2, which is asset group GP2 has been deleted, and that media key MK1 has been added.

Figure 10:
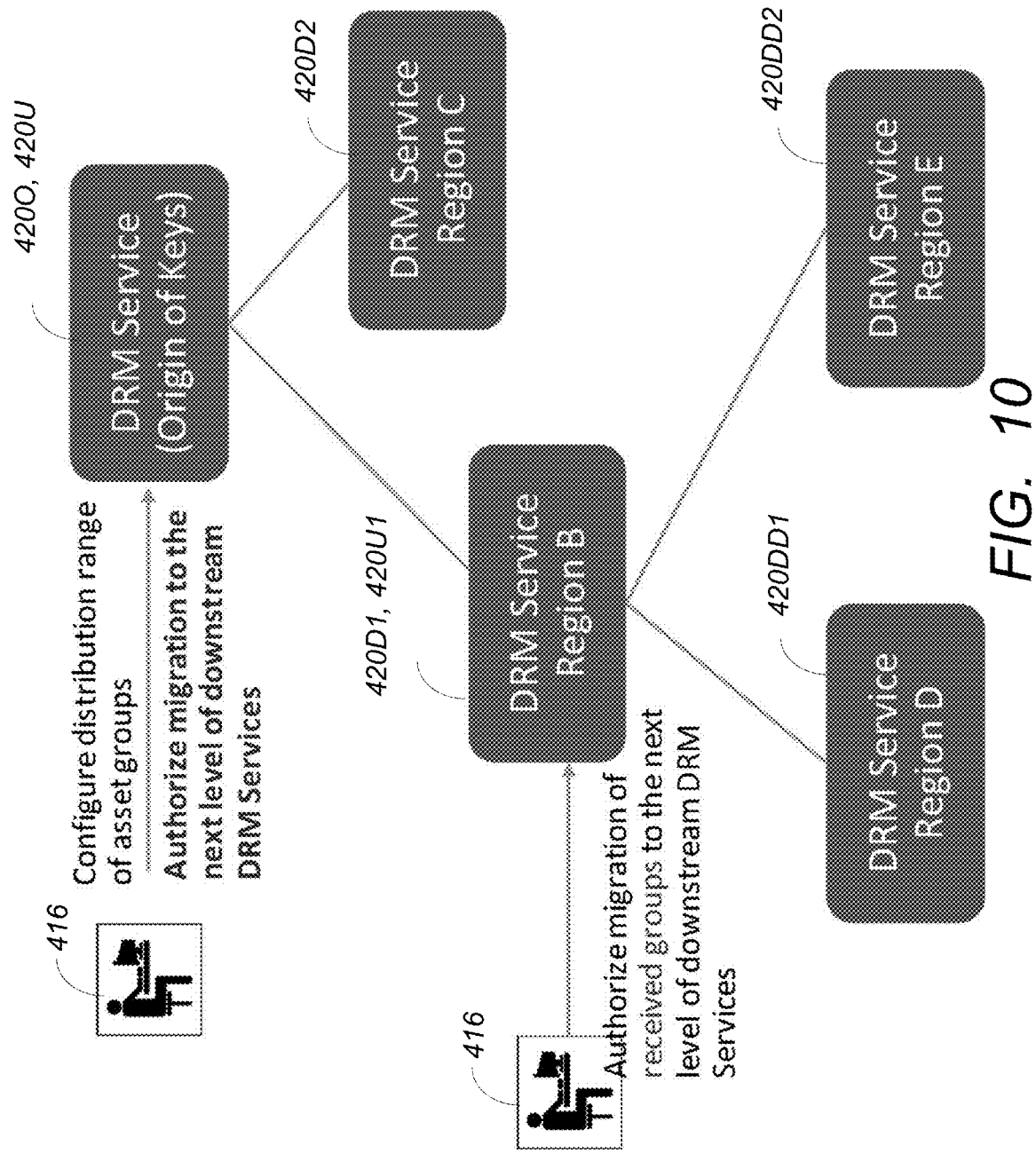
FIG. 10 is a diagram further illustrating the hierarchical migration of asset groups among the plurality of DRM service instances.

FIG. 10 is a diagram further illustrating the hierarchical migration of asset groups among the plurality of DRM service instances 420. In this embodiment, the hierarchical migration of asset groups from upstream DRM service instances to downstream DRM service instances is performed according to the distribution range of the asset group as described above. In addition, administrators 416 of each DRM service instance authorize migration of received groups to adjacently downstream DRM service instances 420 on the next hierarchical level lower than the level of the authorized DRM service instance 420. Hence, at each level, asset groups that are to be migrated to downstream to the next hierarchical level of DRM service instance 420 (according to the distribution range values) are only migrated if explicitly authorized by the administrator 416. The distribution range value of the asset group determines if the DRM service instance 420 can authorize one of the asset groups it has received for further migration to DRM service instances 420 further downstream. In one embodiment, once established by the originating DRM service instance 420O, the distribution range values cannot be modified at a downstream DRM service, and can be modified at the originating DRM service instance 420O that is the source of the asset group. In the illustrated embodiment, with respect to a particular asset group, DRM service instance 420O is the originating DRM service instance, as the media keys and distribution value definitions were established there. DRM service instances serving regions B and C (420D1 and 420D2 respectively) are downstream DRM service instances 420D relative to the originating DRM service instance 420O. The DRM service instance 420D1 downstream of originating DRM service instance 420O/420U is also an upstream DRM service instance 420U1 of DRM service instances serving regions D and E (420D1 and 420D2, respectively).

Figure 11:
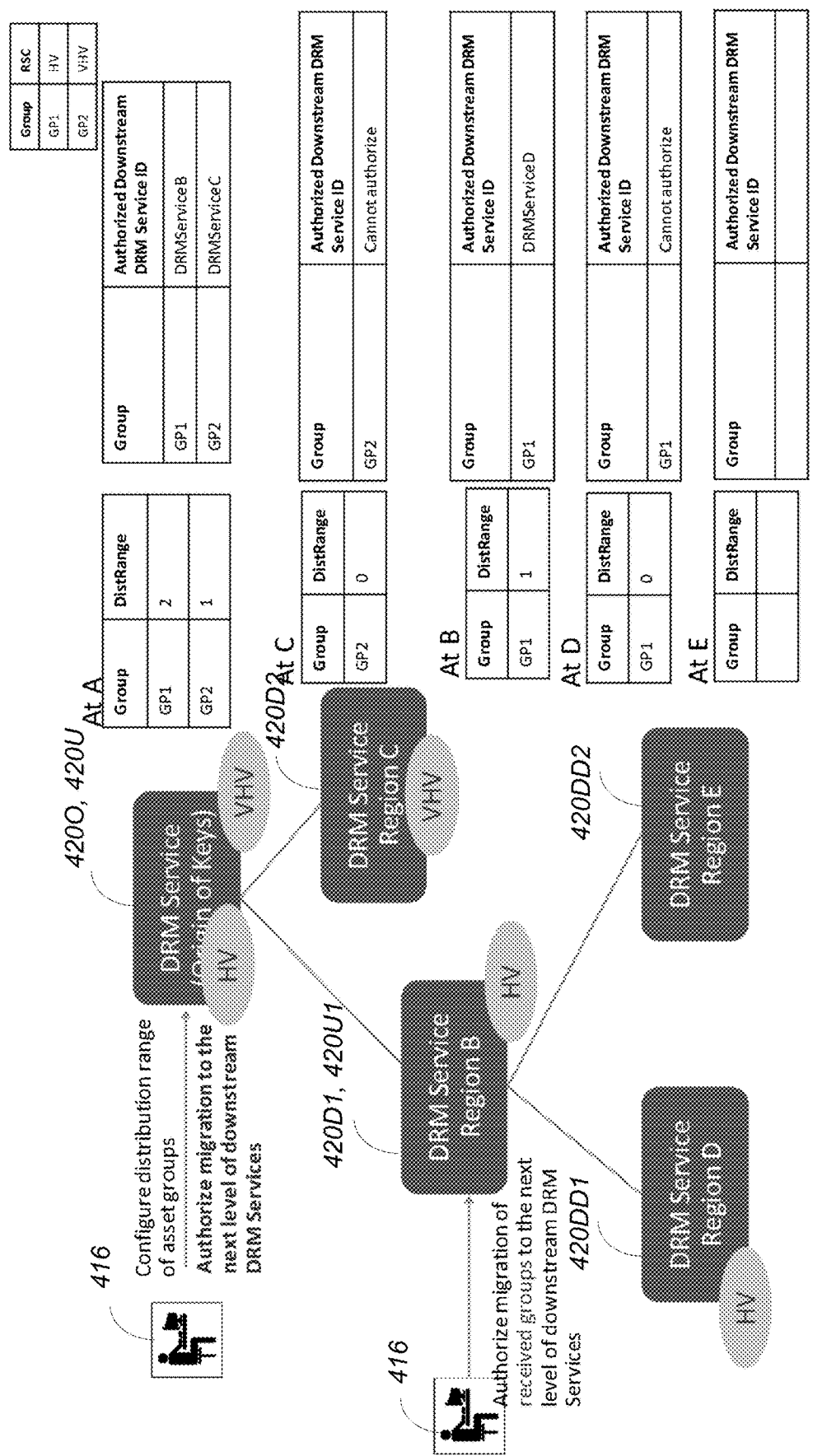
FIG. 11 is a diagram further illustrating the downstream migration of the asset groups subject to authorization at each upstream DRM service instance.

FIG. 11 is a diagram further illustrating the downstream migration of the asset groups subject to authorization at each upstream DRM service instance 420. Initially, an administrator 426 configures the distribution range of a plurality of asset groups, and authorizes migration to the next level of downstream DRM service instances 420. In the illustrated example, the administrator 416 configures a group of assets GP1 associated with RSC HV having a distribution range of two and another group of assets GP2 associated with RSC VHV and having a distribution range of one. The administrator also authorizes migration of the asset groups to the next level of downstream services, as illustrated in the downstream service authorization table. In the illustrated embodiment, asset group GP1 is authorized to be migrated down to two DRM service instances that are downstream and hierarchically adjacent to the originating DRM service instance, namely the DRM service instance serving region B 420D1 (DRMServiceB) and the DRM service instance 420DD1 serving region D (DRMServiceD). At the outset, the originating DRM service instance 420O has the media keys to support both HV and VHV RSCs.

One of the DRM service instances 420D downstream and hierarchically adjacent to the originating DRM service instance 420O (e.g. the DRM service instance 420D2 serving region C having the DRMServiceID DRMServiceC requests a list of asset groups allowed by the originating DRM service instance 420O and other information as described in FIG. 8). Ordinarily, the originating DRM service instance 420O would provide both asset group GP1 and asset group GP2 to the downstream DRM service instance 420D2 making that request, and that downstream DRM service instance 420D2 would decrement the distribution range to determine which asset groups may be migrated further downstream to DRM service instances. However, as indicated in the authorized downstream DRM service table, the administrator 416 has only authorized asset group GP2 to migrate down to the downstream DRM service instance 420D2. Hence, as shown in FIG. 11, the distribution range value associated with group GP2 has been decremented from one to zero, but group GP1 has not been migrated at all.

Another one of the DRM service instances 420D downstream and hierarchically adjacent to the originating DRM service instance 420O (e.g. the DRM service instance 420D1 serving region B having the DRMServiceID DRMServiceB) requests a list of asset groups allowed by the originating DRM service instance 420O and other information as described in FIG. 8). Ordinarily, the originating DRM service instance 420O would provide both asset group GP1 and asset group GP2 to the downstream DRM service instance 420D1, and that downstream DRM service instance 420D1 would decrement the distribution range to determine which asset groups have migrated to the downstream DRM service instance 420D1. However, as indicated in the authorized downstream DRM service table, the administrator 116 has only authorized asset group GP1 to migrate down to the downstream DRM service instance 420D1. Hence, as shown in FIG. 11, the distribution range value associated with group GP1 has been decremented from two to one, but group GP2 has not been migrated at all. The DRM service instance 420D1 in region B is therefore enabled to provide the media program assets in group GP1 (RSC of HV) to devices in region B.

No further downstream migration of the asset groups originated by originating DRM service instance 420O is permitted unless authorized by the administrator 416. However, in the illustrated example, the administrator 416 has authorized migration of the asset groups at the DRM service instance 420D serving region B to downstream DRM service instance D 420DD1 but not downstream DRM service instance E 420DD2, as indicated in the downstream DRM authorization table. Further, since the decremented distribution range value associated with group GP1 is one at the DRM service instance servicing region B 420D1, when the downstream DRM service instance serving region D 420DD1 requests the list of asset groups and decrements the distribution range values from upstream (relative to DRM service instance servicing region D 420DD1), the resulting distribution range value for group GP1 is zero, indicating that the group GP1 has migrated to the DRM service instance serving region D 420DD1. However, since the DRM service instance serving region D 420DD1 has not received asset group GP2, migration of GP2 from that DRM service instance 420DD1 is not possible. Further note that asset group GP1 does not migrate to the DRM service instance serving region E 420DD2 because the upstream (relative to DRM service instance 420DD2) DRM service instance serving region B 420D1 has not been authorized to permit such migration. As a consequence, the DRM service instance serving region B 420D1 does not provide a list of asset groups in response to a request from the DRM service instance serving region E 420D2.

Figure 12:
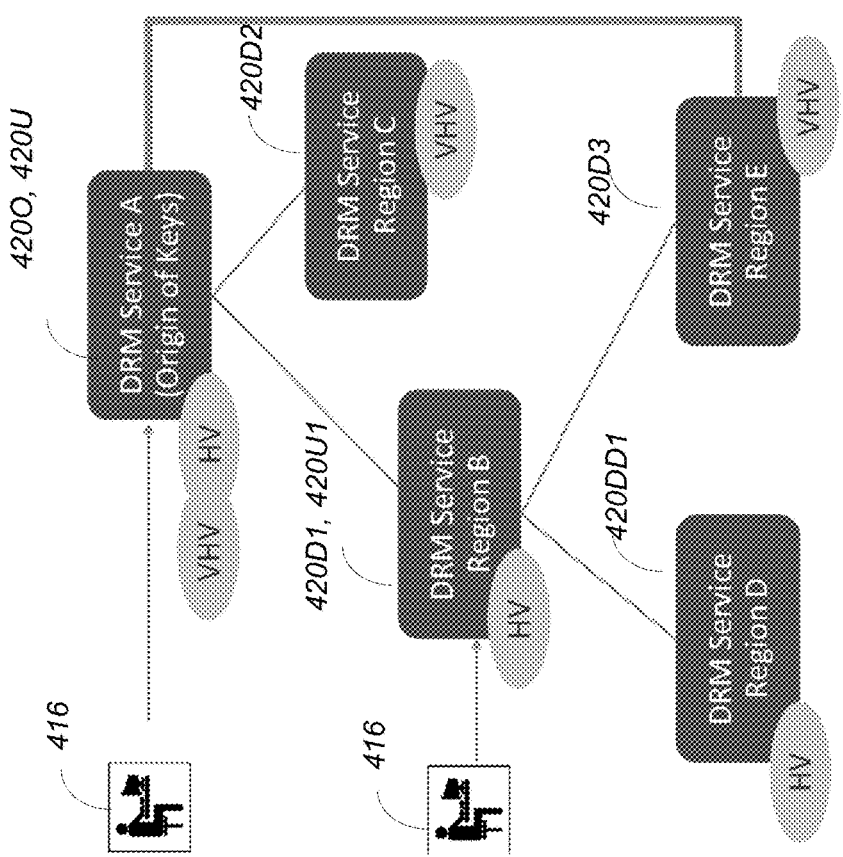
FIG. 12 is a diagram illustrating how an administrator may change the authorization to permit migration of an asset group to a downstream DRM service instance.

FIG. 12 is a diagram illustrating how an administrator may change the authorization to permit migration of an asset group to a downstream DRM service instance. In this example, the administrator 416 desires to permit migration of asset group GP2 (associated with RSC of VHV) to the DRM service instance serving region E 420D3. The DRM service instance serving region E 420D3 is now adjacently downstream from the originating DRM service instance (DRM service instance A 420U), so the asset group GP2 can migrate from the originating DRM service instance 420U directly to the DRM service instance serving region E 420D3, without migrating through an intermediary DRM service instance 420D1, 420U1 (the DRM service instance serving region B). In fact, since the distribution range of asset group GP2 at the originating DRM service instance 420O is only one, asset group GP2 cannot migrate further than one level down in the hierarchy (e.g. it can migrate to the DRM service instance serving region B 420D1, but not from that DRM service instance to any downstream DRM service instances. However, since the table of authorized downstream DRM service instance migration now lists the DRM service instance serving region E 420D3 (DRMServiceE), and this DRM service is one hierarchical level below the originating DRM service 420O, a request from the DRM service instance serving region E 420D3 to the originating DRM service instance 420O for a list of asset groups will be responded to with an asset group list including group GP2.

Figure 13:
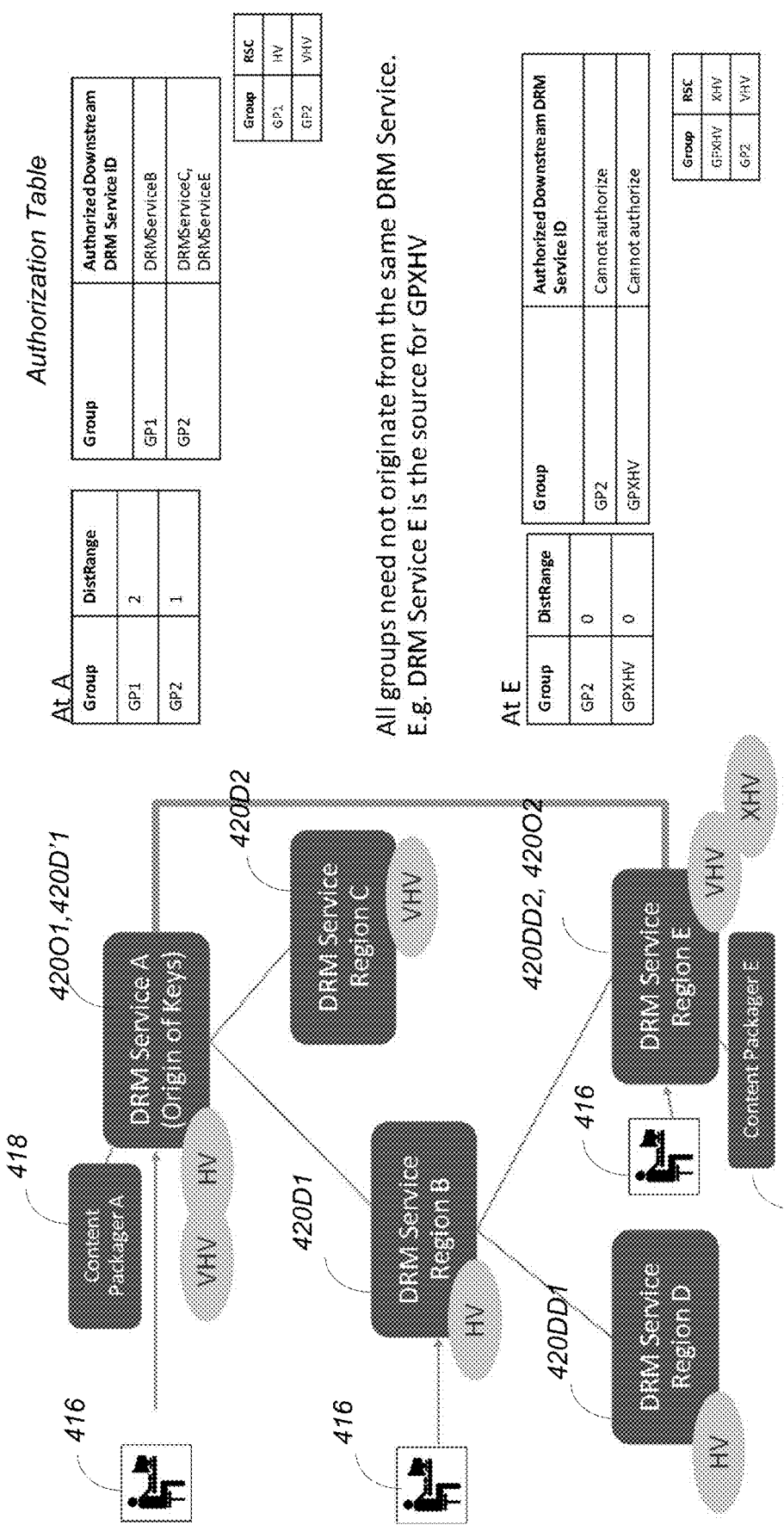
FIG. 13 is a diagram illustrating another feature of the downstream migration paradigm.

FIG. 13 is a diagram illustrating another feature of the downstream migration paradigm. Asset groups in a network of DRM service instances 420 need not originate from the same originating DRM service instance 420O. Instead, a first set asset groups can be created by content packager 1402 and defined for one originating DRM service instance 420O1 and migrated to a second DRM service instance 420DD2 downstream from the first DRM service instance, while at the same, a second set of asset groups can be defined in the second DRM instance 420O2 and migrated to the first DRM service instance 420D'1 (which, for the second set of asset groups, is downstream of the second DRM service instance 420O2. As shown in FIG. 13, DRM service instance E 420DD2 can be the originating DRM service instance 420O2 for asset group GPXHV which has an RSC of extra high value (XHV). In the illustrated example, the administrator 416 has not authorized the DRM service instance in region E (now the originating DRM service instance 420O2) to allow migration of asset group GPXHV to any downstream DRM service instance.

Figure 14:
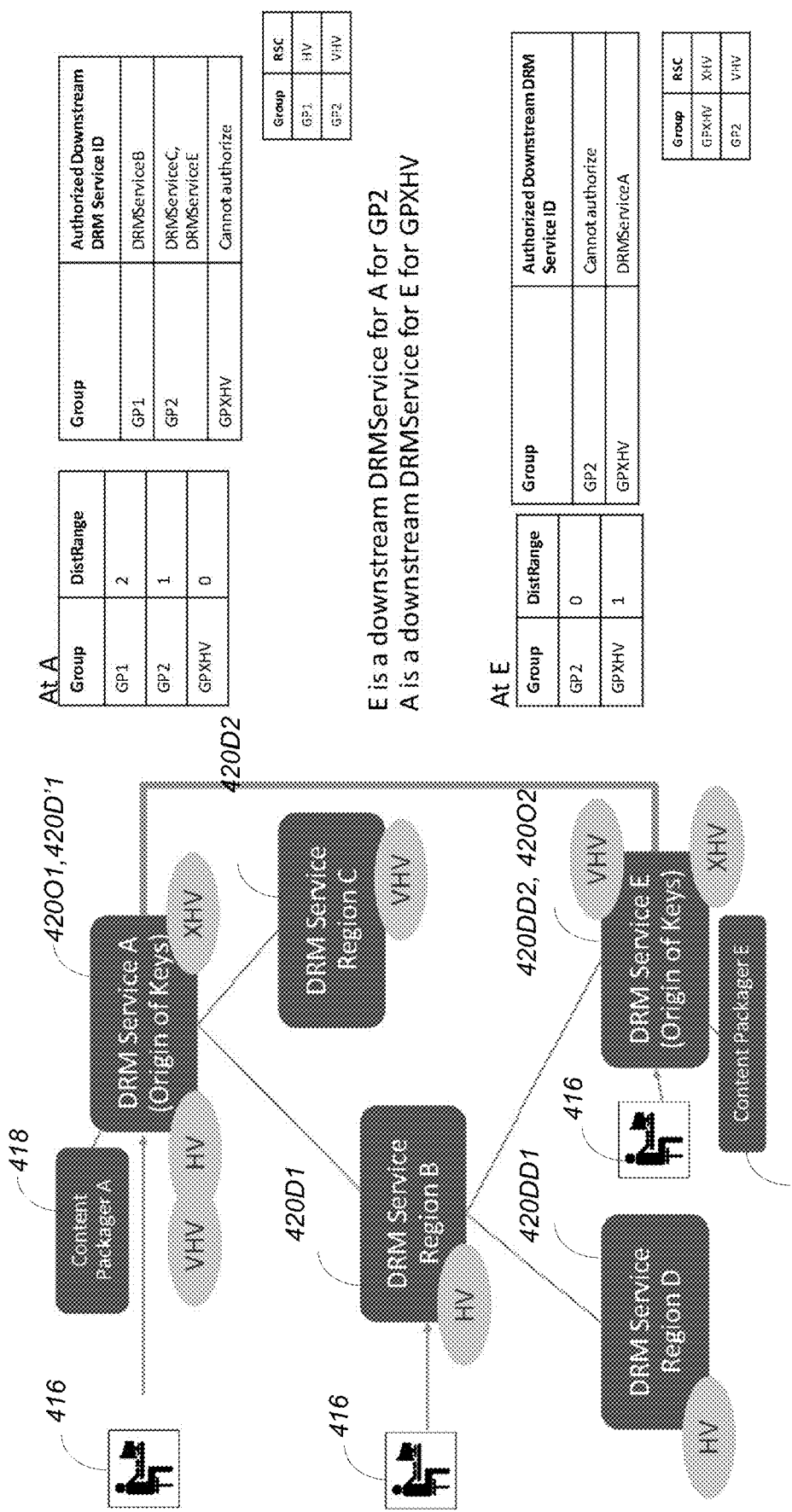
FIG. 14 is a diagram illustrating the migration paradigm after the administrator 416 has changed the value of the distribution range.

FIG. 14 is a diagram illustrating the migration paradigm after the administrator 416 has changed the value of the distribution range associated with asset group GPXHV to permit migration to the downstream DRM service instance 420D'1 at the adjacent lower hierarchical level (e.g. by assigning a value of one) and has authorized migration of the asset group GPXHV from the originating DRM service instance 420O1 (the DRM service E) to DRM service instance A 420D'1, as reflected in the authorization table. Hence, when DRM service A 420D'1 (which is adjacently downstream from DRM service E 420O2 for purpose of groups defined at originating DRM service instance E 420O2) requests a list of asset groups from upstream and originating DRM service instance E 420O2, DRM service instance E 420O2 responds with the updated list, and DRM service instance A 420D'1 receives the list, decrements the distribution range for group GPXHV by one, resulting in a zero value that prevents further downstream migration. In addition, the administrator 426 has not authorized downstream migration of group GPXHV, as indicated in the authorized downstream migration table.

Figure 15:
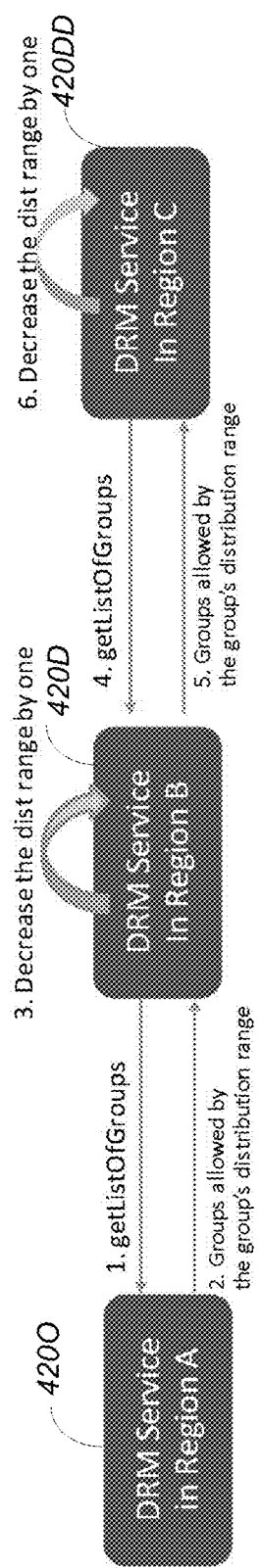
FIGS. 15 and 16 are diagrams illustrating a use case for an exemplary migration of an asset group.
Figure 15:
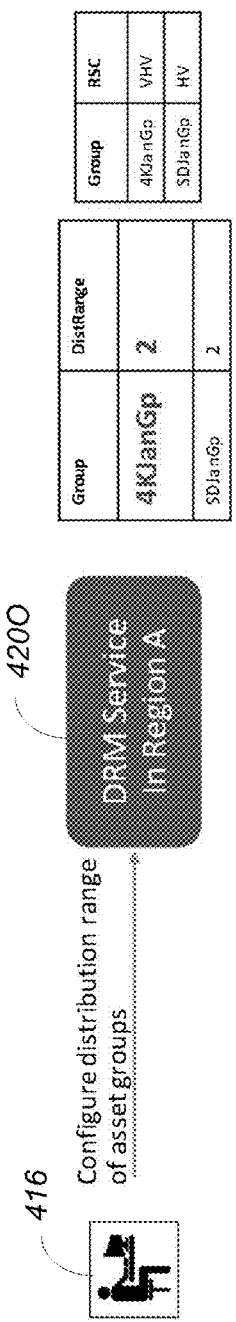
Figure 16:
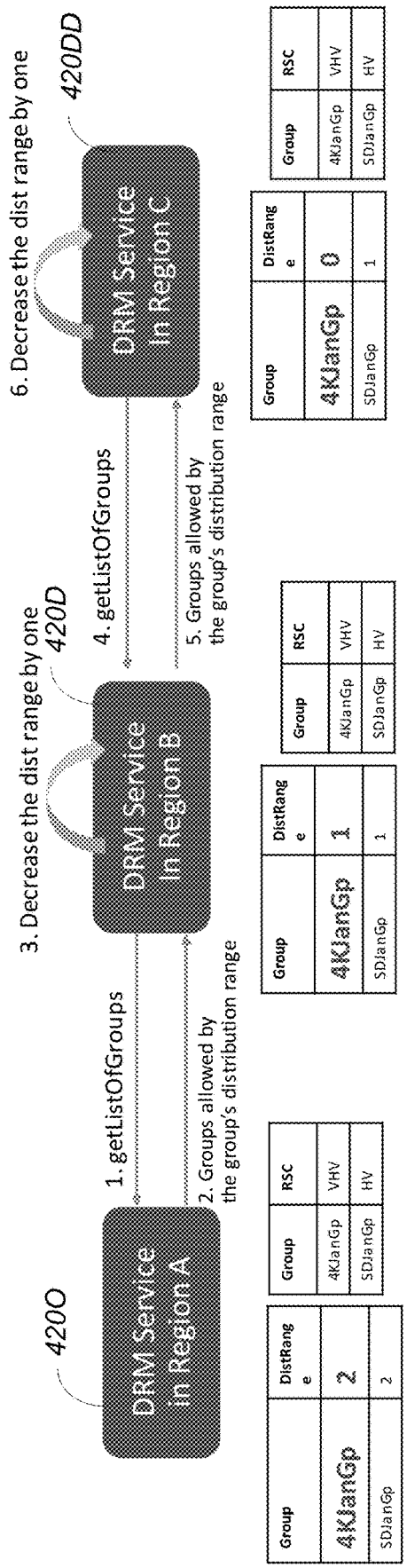

FIGS. 15 and 16 are diagrams illustrating a use case for an exemplary migration of an asset group. In this example, all migrations are authorized by each DRM service instance's respective administrator 416. Turning first to FIG. 15, consider a hierarchy of DRM service instances including originating DRM service instance serving region A 420O (hereinafter referred to as DRM service instance A 420O), a downstream DRM service instance serving region B 420D1 (hereinafter referred to as DRM service instance B 420D), and a further downstream DRM service instance serving region C 420DD1 (hereinafter referred to as DRM service instance C 420DD). Originating DRM service instance A 420O may instead simply be a DRM service instance that is adjacently upstream from DRM service instance B and upstream from DRM service region C 420O.

The administrator 416 wants to distribute assets, with 4K January releases made available to devices in regions A and B in January of 2017, and in geography C in March 2017. The administrator 416 defines asset groups 4KJanGp (for example, an asset group having an RSC of VHV required to present assets of 4K resolution) and SDJanGp (for example, an asset group having an RSC of HV required to present a standard definition version of assets). The administrator 416 has also set the distribution range of group 4KJanGp to one, and the distribution range of two in the originating DRM service instance 420O (e.g. DRM service instance A). In step 1, DRM service instance B 420D transmits a request to adjacently upstream DRM service instance A 420O for a list of groups. This is a request for a list of all groups in the originating DRM service instance A 420O. The DRM service instance A 420O responds with a list of asset groups allowed by DRM service instance A 420O, which includes metadata associated with those asset groups, such as the RSC associated with each of the asset groups, as illustrated above in FIG. 8. DRM service instance B 420D decrements the original group distribution ranges for each asset group described in the received list, resulting in the illustrated distribution range table associated with DRM service instance B 420D. The distribution range value for group 4KJanGp is now zero (indicating no further downstream migration of this group is possible from DRM service instance B 420D) and the distribution range value for group SDJanGp is now one (indicating that group SDJanGp may (if authorized) be migrated another level lower in the hierarchy. DRM service instance B now requests and obtains a list of keys for each group included in the list and updates its databases and tables accordingly, as illustrated in FIG. 9.

DRM service instance C 420DD requests a list of groups from upstream DRM service B 420D, it is provided with only asset group SDJanGp (as the incremented distribution range value for group 4KJanGp is zero in the upstream DRM service instance 420D. However, since the distribution range of asset group SDJanGP at the originating DRM service 420O is 2, asset group SDJanGP is permitted to migrate down to DRM Service C 420DD when DRM service C 420DD requests the list of groups from upstream DRM service B 420D.

In March 2017, the administrator would like asset group 4KJanGp to region C. This can be accomplished by reconfiguring the distribution range of the asset group 4KJanGP in the originating DRM service instance 420O to a distribution value of one greater than before (e.g. a distribution range value of 2).

FIG. 16 is a diagram illustrating the hierarchical migration of the asset groups after the administrator 416 reconfigures the distribution group value for group 4KJanGp in the originating DRM service instance 420O to a value of 2. Now, when DRM service instance B 420D requests a list of groups allowed by the upstream DRM service instance, the distance range value (before being decremented) for group 4KJanGp is 2, and is decremented to 1. Further, when DRM service instance C 420DD requests the list of asset groups allowed by the upstream DRM service instance (e.g. DRM Service B 420D), it receives the list from the upstream DRM service instance 420D indicating that the distribution range value for group 4KJanGp is one, decrements that distribution range value to zero, and stores it in the relevant table of DRM Service C 420DD. The media keys for group 4KJanGp are also conveyed as described in FIG. 9, and hence, the media keys for the group 4KJanGp have migrated to DRM service C 420DD.

Note that in the foregoing simple example, the scope of the migration of asset groups, and their related media keys and RSCs is controlled on the basis of the hierarchical distance from the originating DRM service instance 420O. Therefore, if there were a DRM service instance in a region D, that DRM service instance may also request and obtain the list of asset groups, and the associated media keys. As described above, the migration of asset groups from an upstream DRM service instance to a downstream DRM service instance can also be controlled by an administrator on a DRM service instance by DRM service instance basis. So the use case of wanting the asset group and keys to be in place for regions A and B in January of 2017, and then also migrate to region C in March 17 could also have been implemented by using a distribution range of 2 in the originating DRM service instance 420O, while failing to authorize the migration of that group asset from DRM Service B 420D to DRM Service C 420DD (note also that the authorization for such migration could have been defined before March 2017 and simply made effective on March 2017). Controlling migration by selection of distribution range allows for migration of asset groups and using the DRM service instance 420 by DRM service instance 420 authorization permits exceptions to the general migration defined by the distribution range values.

Figure 17:
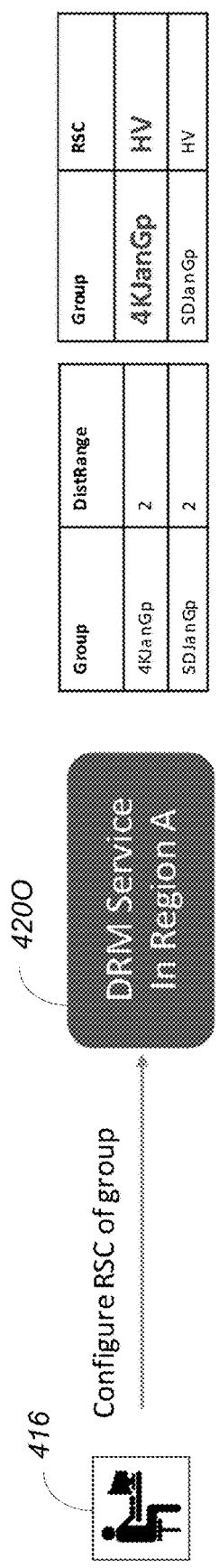
FIGS. 17 and 18 are diagrams illustrating a further use case.
Figure 18:
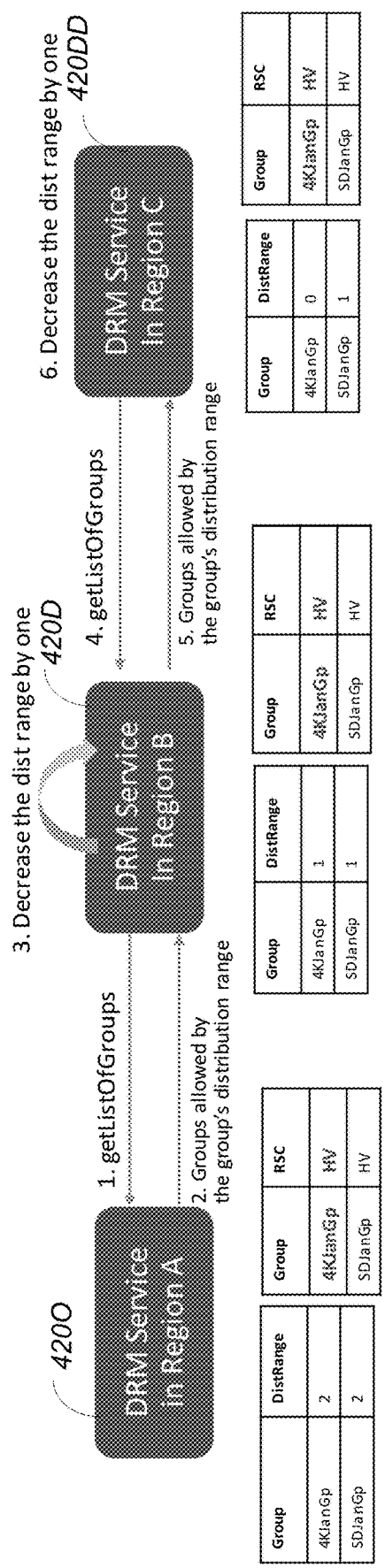

FIGS. 17 and 18 are diagrams illustrating a further use case wherein in June of 2017, the service provider would like to permit the asset group 4KJanGp to be playable on more devices (e.g. devices with a lower security capability than VHV). This may be the case, for example, if the value of the asset group 4KJanGp has decreased. Referring first to FIG. 17, the administrator configures the RSC of asset group 4KJanGp to be HV instead of VHV. This can be accomplished, for example, by setting the RSC value associated with asset group 4KJanGp to be HV instead of VHV, as before.

FIG. 18 illustrates the migration of the change in the RSC from the originating DRM service instance 420O to the adjacent downstream DRM service instance 420D and the DRM service instance 420DD adjacently downstream of the downstream DRM service instance 420D. Since the distribution range value of the group 4KJanGp has was earlier changed to two, asset group 4KJanGp migrates through to the DRM service instance 420DD two hierarchical levels below the originating DRM service instance 420O. DRM service instance B 420D requests a list of groups from upstream (and originating) DRM service instance A 420O, and (since the administrator 416 has not prevented such migration), asset groups allowed by DRM service instance A 420O are provided to DRM service instance B 420D. Along with the asset groups allowed by the upstream DRM service instance 420O, RSC information is also provided (e.g. in the form of asset group metadata, as described in FIG. 8 above). The distribution group values are decremented, the updated RSC (now HV) is stored in the RSC table of the DRM service instance B 420D, and the DRM service instance B 420D requests the media keys of the asset groups in its table. Similarly, DRM service instance C 420DD requests a list of groups allowed by the distribution range value for group 4KJanGp stored by upstream DRM service instance B 420D. The list of groups is provided, and the distribution range for each group is decremented by one, resulting in the table as illustrated. Further, the metadata about the group (including the RSC of HV) is also provided, and the DRM service in region C 420DD updates the RSC table to reflect the change. DRM service instance C 420DD then request media keys for the groups in the asset group list.

Figure 19:
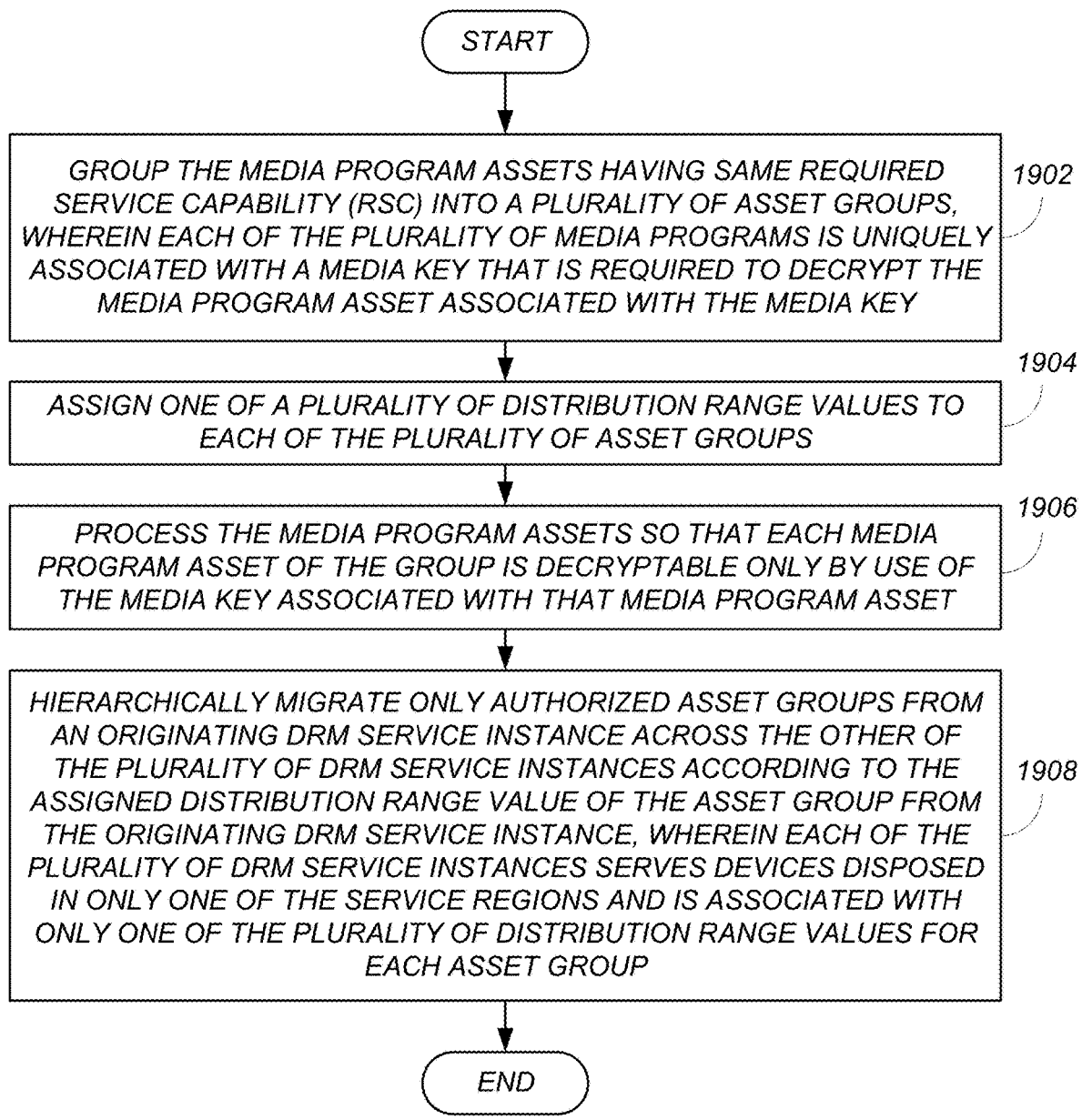
FIGS. 19-26 are diagrams presenting exemplary process flows for embodiments of the asset distribution system.

FIGS. 19-26 are diagrams presenting exemplary process flows for embodiments of the asset distribution system. FIG. 19 is a diagram presenting a top level exemplary process flow. In block 1902, the media program assets having the same RSC are grouped into plurality of asset groups. Assets with the same RSC need not be in the same asset group, but assets in the same group must have the same RSC. Each of the plurality of media programs is uniquely associated with a media key that is required to decrypt the media program asset associated with that key. In block 1904 one of a plurality of distribution range values are assigned to each of the plurality of asset groups. In block 1906, the media program assets are processed so that each media program asset of the group is decryptable only by use of the media key associated with that media program asset. This can be accomplished, for example, by encrypting each media program asset with the media key associated with the media program asset and associated with the group of media program assets to which the media program asset belongs or by encrypting information required to encrypt each media program asset with the media key associated with the media program asset and associated with the group of media program assets to which the media program asset belongs.

In block 1908, asset groups are hierarchically migrated from an originating DRM service instance 420O across the other of the plurality of DRM service instances 420 according to the assigned distribution range value of the asset group from the originating DRM service instance 420O, wherein each of the plurality of DRM service instances serves devices disposed in only one of the service regions and is associated with only one of the plurality of distribution range values for each asset group. In one embodiment, the asset groups are permitted to migrate from upstream DRM service instances 420U to downstream DRM service instances 420D only if specifically authorized on a DRM service instance-by-DRM service instance basis.

Figure 20:
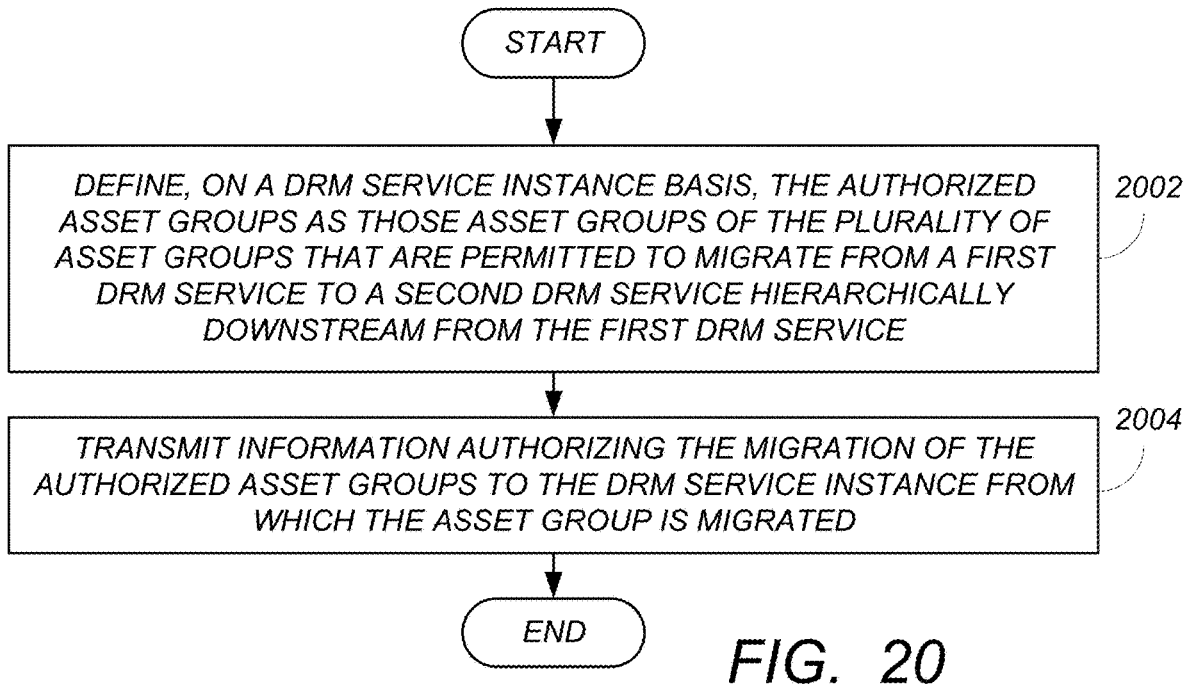

FIG. 20 is a diagram illustrating a process by which migration of asset groups is permitted on a DRM service instance by DRM service instance bases. In block 2002, authorized asset groups are defined as those asset groups of the plurality of asset groups that are permitted to migrate from a first DRM service instance to a second DRM service instance downstream of the first DRM service instance. In block 2004, information authorizing the migration of the authorized asset groups to the DRM service instance 420 from which the asset group is migrated is transmitted from the administrator 416 to the applicable DRM service instance 420.

Figure 21:
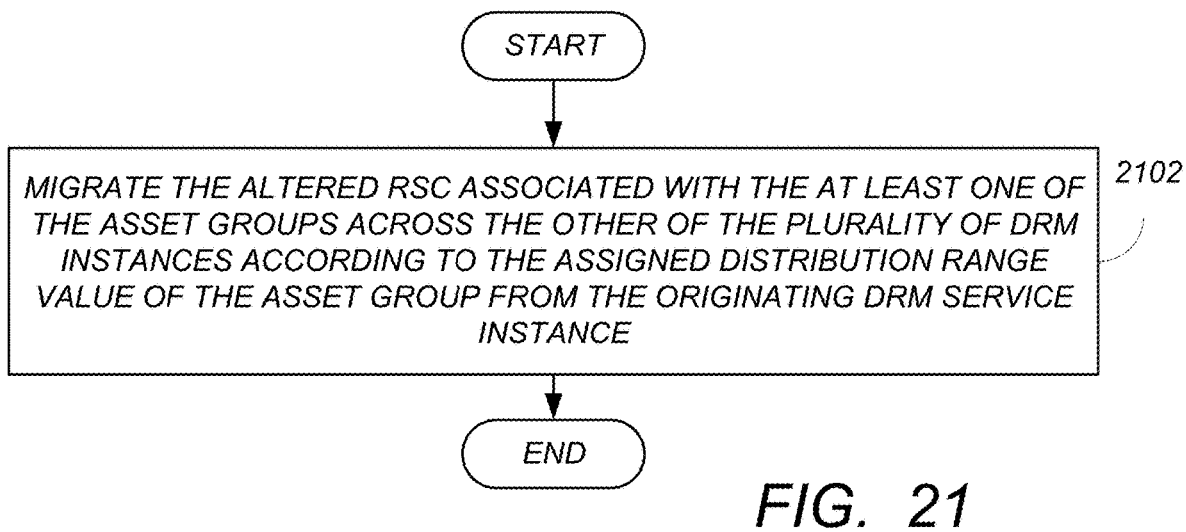

In an embodiment described above, the RSC associated with at least one of the asset groups at the originating DRM service instance 420O is altered. FIG. 21 is a diagram illustrating how RSCs may also be migrated across the DRM instances. In this embodiment, the hierarchical migration of only authorized asset groups from the DRM service instance across the other of the plurality of DRM service instances further comprises migrating the altered RSC. As shown in FIG. 21, the altered RSC associated with the asset group(s) is migrated across the other of the plurality of DRM service instances according to the assigned distribution range value of the asset group from the originating DRM service instance, as shown in block 2102.

Figure 22:
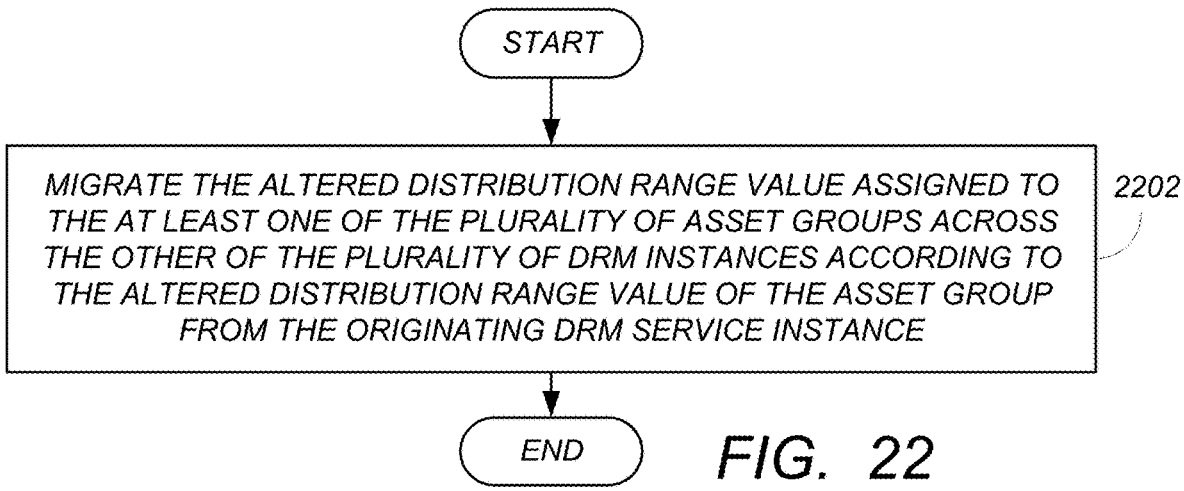

In another embodiment described above, the distribution range associated with at least one of the asset groups at the originating DRM service instance 420 is altered. FIG. 22 is a diagram illustrating how such distribution range is migrated across the plurality of DRM instances. As shown in block 2202, the altered distribution range value assigned to the asset group is migrated across the other of the plurality of DRM instances according to the altered distribution range value of the asset group from the originating DRM service instance.

Figure 23:
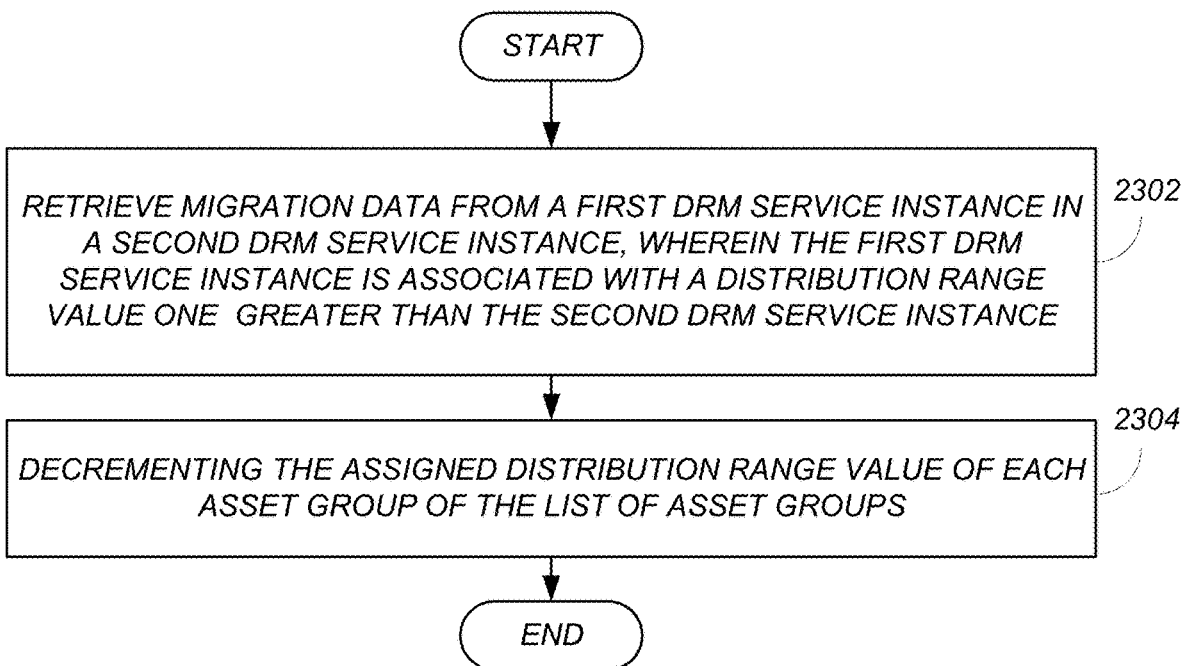

FIG. 23 is a diagram illustrating one embodiment of how the operation of hierarchically migrating only authorized asset groups from an originating DRM service instance across the other of the plurality of DRM service instances according to the assigned distribution range value of the asset group from the originating DRM service (e.g. the operations of block 1908) may be performed. As shown in block 2302, migration data is retrieved from a first DRM service instance in a second DRM service instance, wherein the first DRM service instance is associated with a distribution range value grater than the distribution range value of the second DRM service instance. In one embodiment, the migration data includes a list of asset groups allowed by a first DRM service instance in a second DRM service instance, wherein the first DRM service instance is associated with a distribution range value one grater than the second DRM service instance and the RSC associated with each asset group in the list of asset groups. In block 2304, the assigned distribution range value of each asset group of the list of asset groups is decremented.

Figure 24:
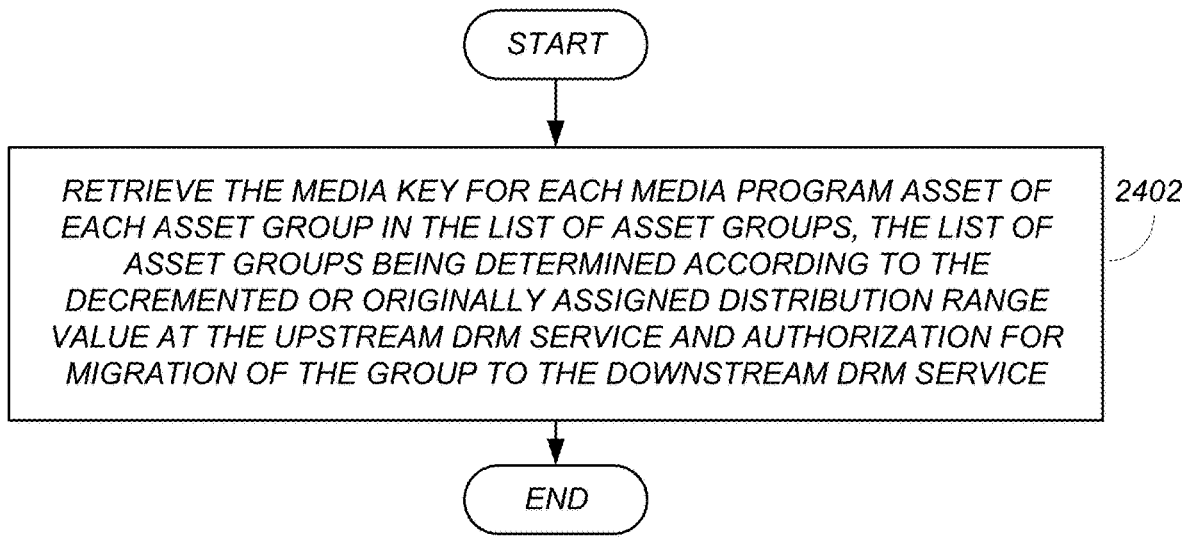

FIG. 24 is a diagram illustrating exemplary operations for hierarchically migrating only authorized asset groups from an originating DRM service instance across the other of the plurality of DRM service instances according to the assigned distribution range value of the asset group from the originating DRM service. As shown in block 2402, the media key for each media program asset of each asset group in the list of asset groups is retrieved, the list of asset groups being determined according to the decremented or originally assigned distribution range value at the upstream DRM Service and authorization for migration of the group to the downstream DRM Service.

Figure 25:
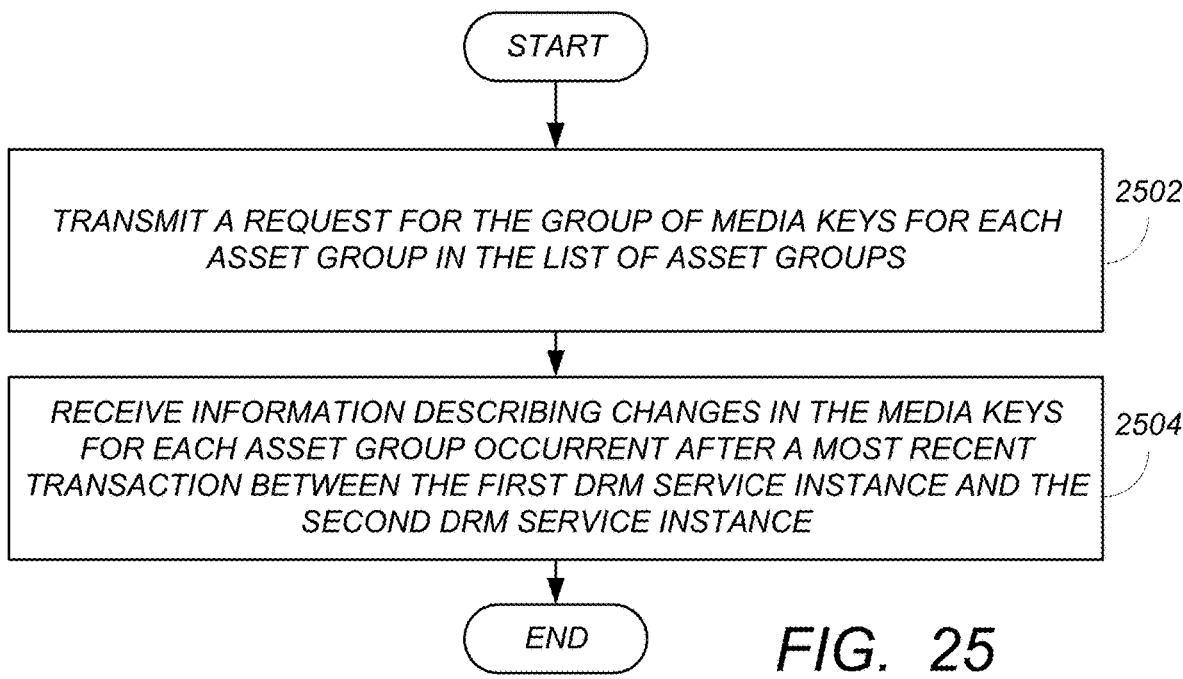

FIG. 25 is a diagram illustrating exemplary operations for retrieving the media key for each media program asset of each asset group in the list of asset groups according to the decremented assigned distribution range value. Block 2502 transmits a request for the group of media keys for each asset group in the list of asset groups. In one embodiment the request for the media keys for each asset group comprises an identifier of the asset group and identifier of a most recent transaction between the second DRM service instance and the first DRM service instance. Block 2504 receives information describing changes in the media keys for each asset group occurrent after a most recent transaction between the first DRM service instance and the second DRM service instance. The identifier of the most recent transaction between the second DRM service instance and the first DRM service instance can then be updated.

Figure 26:
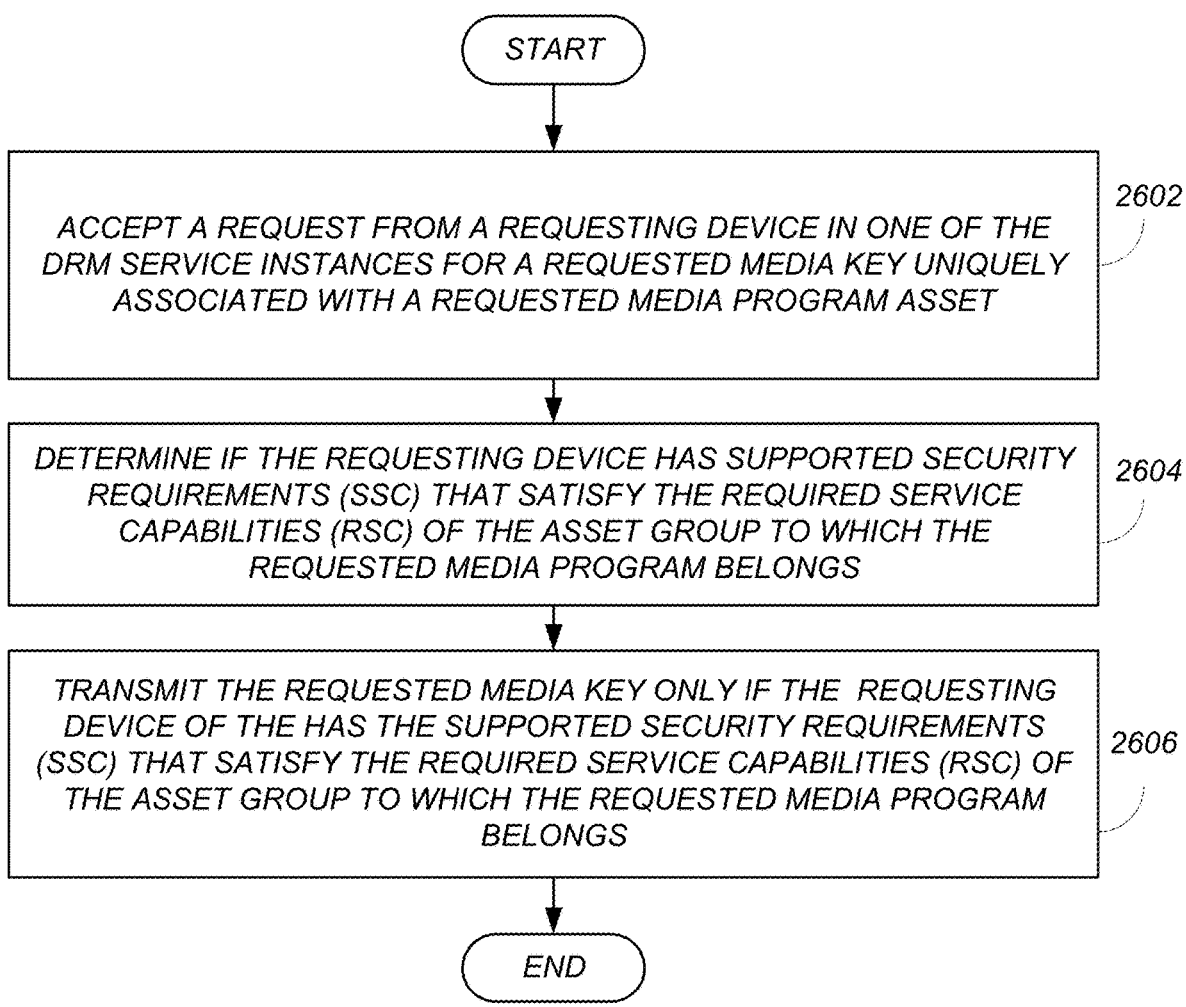

FIG. 26 is a diagram illustrating exemplary process steps by which one of the service devices may obtain a media key for a media asset. In block 2602, a request is accepted from a requesting device in one of the DRM service instances for a requested media key uniquely associated with a requested media program asset. In block 2604, the DRM service instance that accepted the request determines, using the tables stored in its databases, if the requesting device has supported security capabilities (SSC) that satisfy the required security capabilities (RSC) of the asset group to which the requested media program belongs. Finally, in block 2606, the DRM service instance transmits the requested media key only if the requesting device has the supported security capabilities (SSC) that satisfy the required security capabilities (RSC) of the asset group to which the requested media program belongs.

Hardware Environment

Figure 27:
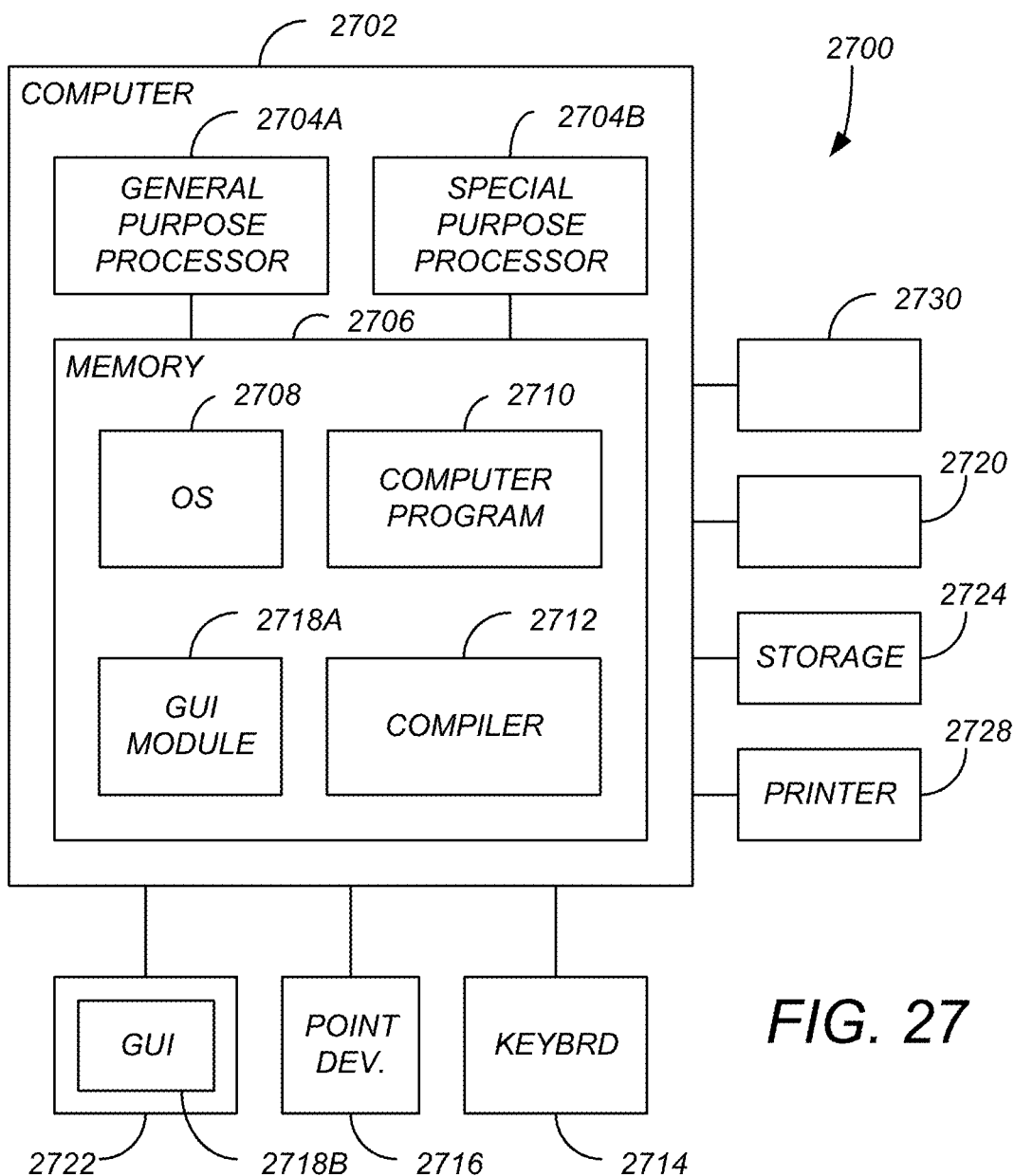
FIG. 27 illustrates an exemplary computer system that could be used to implement processing elements of the geolocation system.

FIG. 27 illustrates an exemplary computer system 2700 that could be used to implement processing elements of the above disclosure, including the originating DRM service instances 420O, upstream and downstream DRM service instances 420U, 420D, CDN 406 and CDN nodes, devices 408, content packager 418, and OSS/BSS 410. The computer 2702 comprises one or more of a general purpose processor 2704A, a special purpose processor 2704B, and a memory, such as random access memory (RAM) 2706. The computer 2702 is operatively coupled to a display 2722, which presents images such as windows to the user on a graphical user interface 2718B. The computer 2702 may be coupled to other devices, such as a keyboard 2714, a mouse device 2716, a printer 2728, etc. Of course, those skilled in the art will recognize that any combination of the above components, or any number of different components, peripherals, and other devices, may be used with the computer 2702.

Generally, the computer 2702 operates under control of an operating system 2708 stored in the memory 2706, and interfaces with the user to accept inputs and commands and to present results through a graphical user interface (GUI) module 2718A. Although the GUI module 2718B is depicted as a separate module, the instructions performing the GUI functions can be resident or distributed in the operating system 2708, the computer program 2710, or implemented with special purpose memory and processors. The computer 2702 also implements a compiler 2712 which allows an application program 2710 written in a programming language such as COBOL, C++, FORTRAN, or other language to be translated into processor 2704 readable code. After completion, the application 2710 accesses and manipulates data stored in the memory 2706 of the computer 2702 using the relationships and logic that was generated using the compiler 2712. The computer 2702 also optionally comprises an external communication device such as a modem, satellite link, Ethernet card, or other device for communicating with other computers.

In one embodiment, instructions implementing the operating system 2708, the computer program 2710, and the compiler 2712 are tangibly embodied in a computer-readable medium, e.g., data storage device 2720, which could include one or more fixed or removable data storage devices, such as a zip drive, floppy disc drive 2724, hard drive, CD-ROM drive, tape drive, etc. Further, the operating system 2708 and the computer program 2710 are comprised of instructions which, when read and executed by the computer 2702, causes the computer 2702 to perform the operations herein described. Computer program 2710 and/or operating instructions may also be tangibly embodied in memory 2706 and/or data communications devices 2730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of selectively providing media program assets to a plurality of devices, each device disposed in only one of a plurality of service regions and having access to only one of a plurality of digital rights management (DRM) service instances, the method comprising:
grouping the media program assets into a plurality of asset groups, each respective asset group having same required security capability (RSC), wherein each of the plurality of media program assets is uniquely associated with a media key that is required to decrypt the media program asset associated with the media key;
assigning one of a plurality of distribution range values to each of the plurality of asset groups;
processing the media program assets so that each media program asset in a respective asset group is decryptable only by use of the media key associated with that media program asset; and
hierarchically migrating only authorized asset groups from an originating DRM service instance across the other of the plurality of DRM service instances according to the distribution range value respectively assigned to each of the plurality of asset groups, wherein each of the plurality of DRM service instances serves devices disposed in only one of the service regions and is associated with only one of the plurality of distribution range values for each asset group.

2. The method of claim 1, further comprising:
defining, on a DRM service instance basis, the authorized asset groups as those asset groups of the plurality of asset groups that are permitted to migrate from a first DRM service to a second DRM service hierarchically downstream from the first DRM service; and
transmitting information authorizing the migration of the authorized asset groups to the DRM service instance from which the asset group is migrated.

3. The method of claim 1, wherein:
the method further comprises altering the RSC associated with at least one of the asset groups at the originating DRM service instance; and wherein
hierarchically migrating only authorized asset groups from the originating DRM service instance across the other of the plurality of DRM instances comprises:
migrating the altered RSC across the other of the plurality of DRM instances.

4. The method of claim 1, wherein:
the method further comprises altering the distribution range value assigned to at least one of the plurality of asset groups at the originating DRM service instance; and wherein
hierarchically migrating only authorized asset groups from the originating DRM service instance across the other of the plurality of DRM instances uses the altered distribution range value.

5. The method of claim 2, wherein hierarchically migrating only authorized asset groups from an originating DRM service instance across the other of the plurality of DRM service instances comprises:
retrieving migration data from the first DRM service instance in the second DRM service instance, wherein the first DRM service instance is associated with a distribution range value one greater than the second DRM service instance, the migration data comprising:
a list of asset groups allowed by the first DRM service instance in the second DRM service instance, wherein the first DRM service instance is associated with a distribution range value one greater than the second DRM service instance; and
the RSC associated with each asset group in the list of asset groups;
decrementing the assigned distribution range value of each asset group of the list of asset groups.

6. The method of claim 5, wherein hierarchically migrating only authorized asset groups from an originating DRM service instance across the other of the plurality of DRM service instances further comprises:
retrieving the media key for each media program asset of each asset group in the list of asset groups according to the decremented assigned distribution range value.

7. The method of claim 6, wherein retrieving the media key for each media program asset of each asset group in the list of asset groups according to the decremented assigned distribution range value comprises:
transmitting a request for a group of media keys for each asset group in the list of asset groups; and
receiving information describing changes in the media keys for each asset group occurrent after a most recent transaction between the first DRM service instance and the second DRM service instance.

8. The method of claim 7, wherein:
the request for the media keys for each asset group comprises:
an identifier of the respective asset group;
an identifier of a most recent transaction between the second DRM service instance and the first DRM service instance; and
the method further comprises:
updating the identifier of the most recent transaction between the second DRM service instance and the first DRM service instance.

9. The method of claim 1, wherein processing the media program assets comprises:
encrypting each media program asset with the media key associated with the media program asset and associated with the group of media program assets to which the media program asset belongs.

10. The method of claim 1, wherein processing the media program assets comprises:
encrypting information required to encrypt each media program asset with the media key associated with the media program asset and associated with the group of media program assets to which the media program asset belongs.

11. The method of claim 1, further comprising:
accepting a request from a requesting device in one of the DRM service instances for a requested media key uniquely associated with a requested media program asset;
determining if the requesting device has supported security capabilities (SSC) that satisfy the required security capabilities (RSC) of the asset group to which the requested media program asset belongs; and
transmitting the requested media key only if the requesting device has the supported security capabilities (SSC) that satisfy the required security capabilities (RSC) of the asset group to which the requested media program asset belongs.

12. An apparatus for selectively providing media program assets to a plurality of devices, each device disposed in only one of a plurality of service regions and having access to only one of a plurality of digital rights management (DRM) service instances, the apparatus comprising:
one or more processors;
one or more memories, each communicatively coupled to an associated one of the one or more processors, each memory storing processor instructions including processor instructions for:
grouping the media program assets into a plurality of asset groups, each respective asset group having same required security capability (RSC), wherein each of the plurality of media program assets is uniquely associated with a media key that is required to decrypt the media program asset associated with the media key;
assigning one of a plurality of distribution range values to each of the plurality of asset groups;
processing the media program assets so that each media program asset in a respective asset group is decryptable only by use of the media key associated with that media program asset; and
hierarchically migrating only authorized asset groups from an originating DRM service instance across the other of the plurality of DRM service instances according to the distribution range value respectively assigned to each of the plurality of asset groups, wherein each of the plurality of DRM service instances serves devices disposed in only one of the service regions and is associated with only one of the plurality of distribution range values for each asset group.

13. The apparatus of claim 12, wherein the processor instructions further comprise first processor instructions for:
defining, on a DRM service instance basis, the authorized asset groups as those asset groups of the plurality of asset groups that are permitted to migrate from a first DRM service to a second DRM service hierarchically downstream from the first DRM service; and
transmitting information authorizing the migration of the authorized asset groups to the DRM service instance from which the asset group is migrated.

14. The apparatus of claim 12, wherein:
the processor instructions further comprise instructions for altering the RSC associated with at least one of the asset groups at the originating DRM service instance; and wherein
the processor instructions for hierarchically migrating only authorized asset groups from the originating DRM service instance across the other of the plurality of DRM instances comprise processor instructions for:
migrating the altered RSC across the other of the plurality of DRM instances.

15. The apparatus of claim 12, wherein:
the processor instructions further comprise processor instructions for altering the distribution range value assigned to at least one of the plurality of asset groups at the originating DRM service instance; and
the processor instructions for hierarchically migrating only authorized asset groups from the originating DRM service instance across the other of the plurality of DRM instances uses the altered distribution range value.

16. The apparatus of claim 15, wherein the processor instructions for hierarchically migrating only authorized asset groups from an originating DRM service instance across the other of the plurality of DRM service instances comprises processor instructions for:
retrieving migration data from a first DRM service instance in a second DRM service instance, wherein the first DRM service instance is associated with a distribution range value one greater than the second DRM service instance, the migration data comprising:
a list of asset groups allowed by the first DRM service instance in the second DRM service instance, wherein the first DRM service instance is associated with a distribution range value one greater than the second DRM service instance; and
the RSC associated with each asset group in the list of asset groups;
decrementing the assigned distribution range value of each asset group of the list of asset groups.

17. The apparatus of claim 16, wherein the processor instructions for hierarchically migrating only authorized asset groups from an originating DRM service instance across the other of the plurality of DRM service instances further comprises processor instructions for:
retrieving the media key for each media program asset of each asset group in the list of asset groups according to the decremented assigned distribution range value.

18. The apparatus of claim 17, wherein the processor instructions for retrieving the media key for each media program asset of each asset group in the list of asset groups according to the decremented assigned distribution range value comprises processor instructions for:
transmitting a request for a group of media keys for each asset group in the list of asset groups; and
receiving information describing changes in the media keys for each asset group occurrent after a most recent transaction between the first DRM service instance and the second DRM service instance.

19. The apparatus of claim 18, wherein:
the request for the media keys for each asset group comprises:
an identifier of the respective asset group;
an identifier of a most recent transaction between the second DRM service instance and the first DRM service instance; and
the processor instructions further comprise processor instructions for:
updating the identifier of the most recent transaction between the second DRM service instance and the first DRM service instance.

20. The apparatus of claim 12, wherein the processor instructions for processing the media program assets comprises processor instructions for:

encrypting each media program asset with the media key associated with the media program asset and associated with the group of media program assets to which the media program asset belongs.

21. The apparatus of claim 12, wherein processor instructions for processing the media program assets comprises processor instructions for:

encrypting information required to encrypt each media program asset with the media key associated with the media program asset and associated with the group of media program assets to which the media program asset belongs.

22. The apparatus of claim 12, wherein the processor instructions further comprise processor instructions for:

accepting a request from a requesting device in one of the DRM service instances for a requested media key uniquely associated with a requested media program asset;

determining if the requesting device has supported security requirements (SSC) that satisfy the required security capabilities (RSC) of the asset group to which the requested media program asset belongs; and transmitting the requested media key only if the requesting device of the has the supported security capabilities (SSC) that satisfy the required security capabilities (RSC) of the asset group to which the requested media program asset belongs.

23. An apparatus for selectively providing media program assets to a plurality of devices, each device disposed in only one of a plurality of service regions and having access to only one of a plurality of digital rights management (DRM) service instances, comprising:

a hardware processor grouping the media program assets into a plurality of asset groups, each respective asset group having same required security capability (RSC), wherein each of the plurality of media program assets is uniquely associated with a media key that is required to decrypt the media program asset associated with the media key;

the processor assigning one of a plurality of distribution range values to each of the plurality of asset groups;

the processor processing the media program assets so that each media program asset in a respective asset group is decryptable only by use of the media key associated with that media program asset; and the processor hierarchically migrating only authorized asset groups from an originating DRM service instance across the other of the plurality of DRM service instances according to the distribution range value respectively assigned to each of the plurality of asset groups, wherein each of the plurality of DRM service instances serves devices disposed in only one of the service regions and is associated with only one of the plurality of distribution range values for each asset group.

* * * * *